United States Patent
Fuierer et al.

(10) Patent No.: US 10,792,703 B2
(45) Date of Patent: Oct. 6, 2020

(54) AEROSOL METHOD FOR COATING

(71) Applicant: NEW MEXICO TECH UNIVERSITY RESEARCH PARK CORPORATION, Socorro, NM (US)

(72) Inventors: Paul Fuierer, Socorro, NM (US); Matthew Hinton, Socorro, NM (US)

(73) Assignee: NEW MEXICO TECH UNIVERSITY RESEARCH PARK CORPORATION, Socorro, NM (US)

( * ) Notice: Subject to any disclaimer, the term of this patent is extended or adjusted under 35 U.S.C. 154(b) by 13 days.

(21) Appl. No.: 16/196,683

(22) Filed: Nov. 20, 2018

(65) Prior Publication Data
US 2019/0224716 A1 Jul. 25, 2019

Related U.S. Application Data

(60) Provisional application No. 62/589,151, filed on Nov. 21, 2017.

(51) Int. Cl.
| | | |
|---|---|---|
| *B05D 1/12* | (2006.01) | |
| *B05D 7/22* | (2006.01) | |
| *C23C 24/04* | (2006.01) | |
| *F16L 58/14* | (2006.01) | |
| *B21C 23/24* | (2006.01) | |
| *B05B 7/14* | (2006.01) | |

(52) U.S. Cl.
CPC .............. *B05D 7/225* (2013.01); *B05B 7/14* (2013.01); *B05D 1/12* (2013.01); *B21C 23/24* (2013.01); *C23C 24/04* (2013.01); *F16L 58/14* (2013.01)

(58) Field of Classification Search
CPC .. B05B 7/14; B05D 1/12; B05D 7/225; B21C 23/24; C23C 24/04; F16L 58/14
See application file for complete search history.

(56) References Cited

U.S. PATENT DOCUMENTS

| 3,081,223 A | 3/1963 | Gunning et al. |
| 3,484,266 A | 12/1969 | Nelson et al. |
| 3,974,306 A | 8/1976 | Inamura et al. |
| 3,982,050 A | 9/1976 | Kato et al. |

(Continued)

FOREIGN PATENT DOCUMENTS

| CN | 101147853 A | 3/2008 |
| CN | 104549076 A | 4/2015 |

(Continued)

OTHER PUBLICATIONS

D. Hanft, J. Exner, M. Schubert, T. Stoecker, P. Fuierer, R. Moos, "An Overview of the Aerosol Deposition Method: Process Fundamentals and New Trends in Materials Applications", Feature Article in J. Ceram. Sci. Tech., 06 [03] 147-182 (2015).

(Continued)

*Primary Examiner* — Alexander M Weddle
(74) *Attorney, Agent, or Firm* — Wilson Sonsini Goodrich & Rosati

(57) ABSTRACT

The present disclosure describes a system and method of depositing ceramic or ceramic composite coatings on the inside surface area of a tubular shape. The system and method described herein can provide an interior coating for tubes and pipes to provide wear resistance, abrasion resistance, and anti-scaling effects.

27 Claims, 15 Drawing Sheets

(56) References Cited

U.S. PATENT DOCUMENTS

Figure 1:
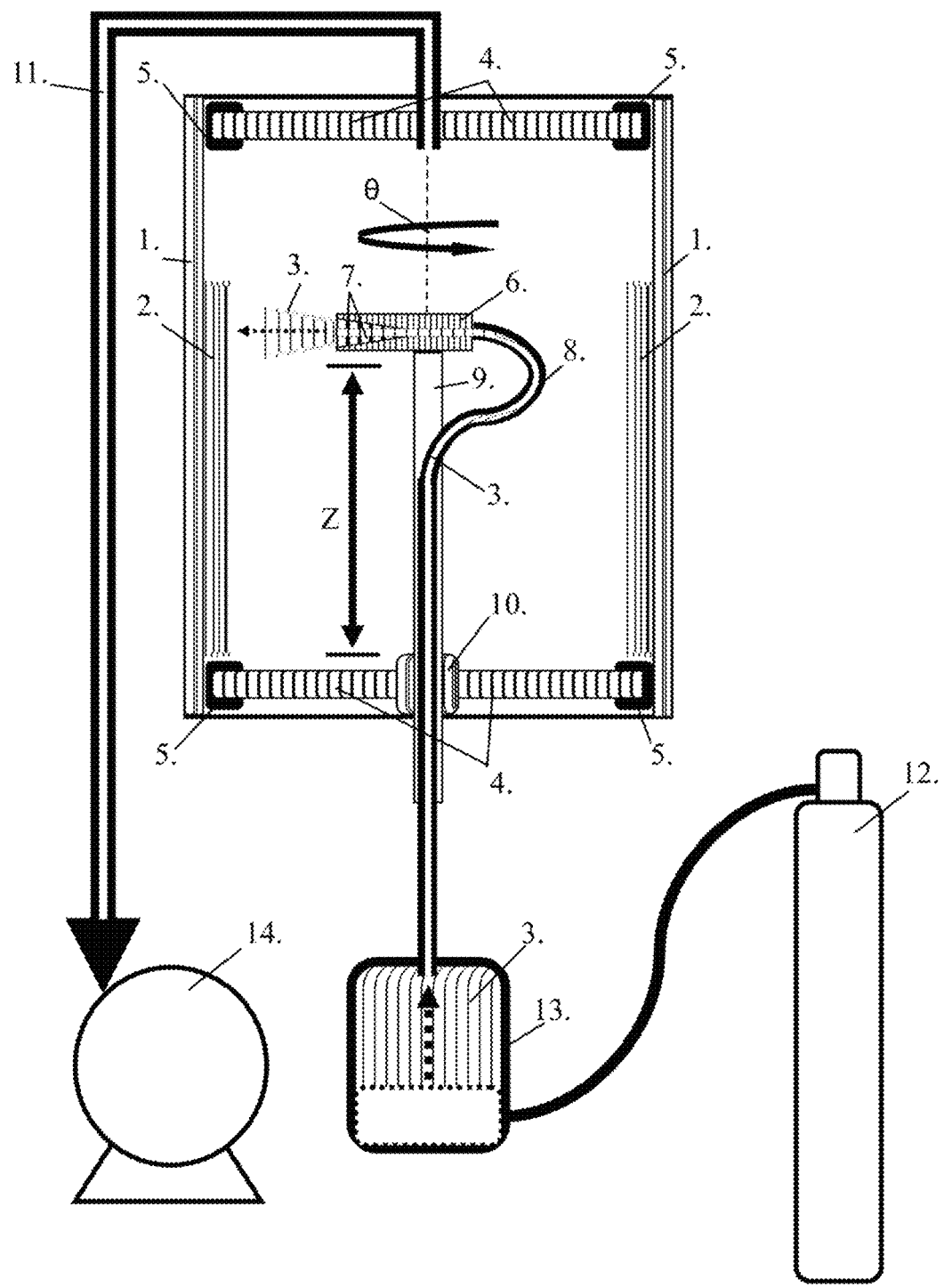

| | | | |
|---|---|---|---|
| 4,089,998 A * | 5/1978 | Gibson | B05B 13/0645 |
| | | | 118/317 |
| 4,182,783 A | 1/1980 | Henery | |
| 4,382,421 A | 5/1983 | Warren et al. | |
| 4,420,508 A | 12/1983 | Gibson | |
| H257 H | 4/1987 | Barditch et al. | |
| 4,698,241 A | 10/1987 | Roberson | |
| 4,798,474 A | 1/1989 | Daily | |
| 5,618,591 A | 4/1997 | Bernstein, Jr. | |
| 5,855,676 A | 1/1999 | Lu et al. | |
| 5,873,951 A | 2/1999 | Wynns et al. | |
| 5,951,761 A | 9/1999 | Edstroem | |
| 6,019,845 A | 2/2000 | Nakakoshi | |
| 6,139,649 A | 10/2000 | Wynns | |
| 6,220,791 B1 | 4/2001 | Hutchins | |
| 6,531,187 B2 | 3/2003 | Akedo | |
| 7,114,751 B2 | 10/2006 | Reynolds, Jr. | |
| 7,479,464 B2 | 1/2009 | Sun et al. | |
| 9,238,864 B2 | 1/2016 | Pelletier | |
| 9,404,186 B2 | 8/2016 | Hatono et al. | |
| 2003/0029018 A1 | 2/2003 | Schwert et al. | |
| 2004/0227227 A1 | 11/2004 | Imanaka et al. | |
| 2007/0128353 A1 | 6/2007 | Gillanders et al. | |
| 2007/0144514 A1 | 6/2007 | Yeates et al. | |
| 2009/0272479 A1 | 11/2009 | McKeen | |
| 2010/0006172 A1 | 1/2010 | Bass et al. | |
| 2012/0091223 A1 | 4/2012 | Yi et al. | |
| 2016/0303604 A1 | 10/2016 | McQueen | |

FOREIGN PATENT DOCUMENTS

| | | |
|---|---|---|
| EP | 2618875 B1 | 12/2017 |
| JP | 2009214056 A | 9/2009 |
| WO | WO-9941011 A1 | 8/1999 |
| WO | WO-2010011076 A2 | 1/2010 |
| WO | WO-2012039720 A1 | 3/2012 |

OTHER PUBLICATIONS

D. Kumar, J. Welch, Z. Xu, "Reduction in scale build-up from sub-surface safety valve using hydrophobic material coating", SPE-166218-MS, presented at the SPE Technical Conference, New Orleans (Sep. 2013).

International Search Report and Written Opinion of PCT/US18/62077 dated Feb. 1, 2019.

L.N. Protasova, M.N. deCroon, V. Hessel, "Review of patent publications from 1990 to 2010 on catalytic coatings on different substrates, including microstructured channels: Preparation, deposition techniques, applications", Recent Patents on Chemical Engineering 5 p. 1 (2012).

M. Crabtree, D. Eslinger, P. Fletcher, A. Johnson, G. King, "Fighting scale-removal and prevention", Oilfied Review p. 30-45 (Autumn, 1999).

Pipe Coatings Market, Global Forecasts to 2020, MarketsandMarkets, 2016. http://www.marketsandmarkets.com/PressReleases/pipe-coatings.asp.

Tiwari, et al. A Cost-Effective Method of Aerosolizing Dry Powdered Nanoparticles, Aerosol Science and Technology, 2013; 47:11, 1267-1275.

Yasuo, et al., Generation of Aerosol Particles by Boiling of Suspensions, Aerosol Science and Technology, 1994; 21:3, 236-240.

* cited by examiner

AEROSOL METHOD FOR COATING

CROSS REFERENCE

This Application claims the benefit of U.S. Provisional Application No. 62/589,151, filed Nov. 21, 2017, which is incorporated herein by reference in its entirety.

BACKGROUND

Tubing and piping used in industrial applications are subjected to scratching, scaling, high temperatures, chemicals, solvents, pressure, bacteria, and other harsh conditions that cause damage or fouling. Conventional methods of coating the interior surfaces of tubing and piping use thermoplastic, epoxy, paint, enamel, or concrete. However, materials such as concrete reduce the inside diameter and effective cross-sectional areas of the tubes and pipes; plastic or polymeric materials are soft and subject to long-term erosion or deterioration; and enameling requires high temperature heat treatment.

INCORPORATION BY REFERENCE

All publications, patents, and patent applications mentioned in this specification are herein incorporated by reference to the same extent as if each individual publication, patent, or patent application was specifically and individually indicated to be incorporated by reference.

SUMMARY OF THE INVENTION

In some embodiments, the disclosure provides a method comprising: 1) inserting an outlet into a tube, wherein the outlet is connected to a container containing powder particles, wherein the tube is connected to a vacuum pump, wherein the container is connected to a source of a carrier gas, wherein the container is connected to the outlet by a gas line, wherein the carrier gas transfers the powder particles from the container to the outlet by the gas line based on a differential in pressure between the source of the carrier gas and the reduced pressure atmosphere inside the tube; 2) creating a reduced pressure atmosphere inside the tube using the vacuum pump; 3) transferring the powder particles from the container to the outlet; and 4) depositing the powder particles onto an inner surface of the tube via the outlet.

In some embodiments, the disclosure provides a system comprising: 1) a tube, wherein: a) a first end of the tube is connected to a vacuum pump by a first seal; and b) a second end of the tube is blocked by a second seal; 2) a nozzle, wherein the nozzle is connected to an inlet, wherein the inlet is introduced through the second seal; 3) a container containing powder particles, wherein the inlet is connected to the container; and 4) a carrier gas source, wherein the container and the carrier gas source are connected by a gas line.

BRIEF DESCRIPTION OF THE FIGURES

FIG. 1 illustrates a coating process using a tubular structure to be coated as a vacuum chamber.

FIG. 2 shows an isometric view of a radial nozzle that can be used in the coating process.

FIG. 3 shows a cross-sectional view of a radial nozzle that can be used in the coating process.

FIG. 4 shows a cross-sectional view of a radial nozzle that can be used in the coating process, placed inside a tube or pipe for full or partial deposition.

FIG. 5 shows an isometric view of a fixed nozzle that can be used in the coating process.

FIG. 6 shows a cross-sectional view of a fixed nozzle that can be used in the coating process.

FIG. 7 shows a cross-sectional view of a fixed nozzle placed inside a tube or pipe for full deposition, or a section of a tube or pipe for partial deposition.

FIG. 8 shows an isometric front-side view of a nozzle capable of four degrees of motion that can be used in the coating process.

FIG. 9 shows an isometric back-side view of a nozzle capable of four degrees of motion that can be used in the coating process.

FIG. 10 shows a cross-sectional front-side view of a nozzle capable of four degrees of motion that can be used in the coating process.

FIG. 11 shows a cross-sectional side-view of a nozzle capable of four degrees of motion that can be used in the coating process.

FIG. 12 shows a cross-sectional side-view of a coating apparatus using a nozzle that is capable of four degrees of motion when placed inside a section of tubing.

FIG. 13 shows a coating apparatus that can be used in a section of pipe or tubing with a large diameter.

FIG. 14 shows a band of titania ($TiO_2$) coating on the inner surface of a nominal 2 inch diameter glass pipe using a coating apparatus of the disclosure.

FIG. 15 shows several bands of titania ($TiO_2$) coating on the inner surface of a nominal 2 inch diameter steel pipe using a coating apparatus of the disclosure.

DETAILED DESCRIPTION

"Aerosol deposition", or "vacuum kinetic spray", or "vacuum cold spray", is a method for forming a film or coating made essentially of brittle material, such as a ceramic. In this method, an aerosol of fine particles including a brittle material, is suspended in a gas and sprayed from a nozzle. The fine particles impact a substrate, embed into the substrate, deform or fracture themselves, re-join, and densify by subsequent impacting particles to form the film or coating. The method can form an adherent film or coating at or near room temperature without the need for binders, and without the need for subsequent heating to achieve densification or functional properties.

Aerosol deposition (AD), also known as vacuum kinetic spraying or vacuum cold spraying, utilizes the kinetic energy of sub-micron or micron-sized particles accelerated through a nozzle by the pressure difference between an aerosolizing chamber or generator and a vacuum deposition chamber to perform deposition of a film or coating. Deposition can occur through the energetic impact of the sub-micron or micron-sized particles with a substrate, fracturing into nano-particles and re-bonding of the nano-particles, and peening and compaction of subsequently impacting particles. A substrate can be any material on which a coating can be deposited. The build-up of films can be rapid. AD can deposit robust, nano-structured coatings at room temperature that exhibit high adhesion strength. AD is an all-solid-state process, and, in some embodiments, can produce a coating with no organic binder present.

The disclosure describes systems and methods for depositing a film or a coating (e.g., a brittle material such as ceramic) on the inside of a hollow structure, for example, the inside surface area of a pipe or a tube. Dense, fine-structured coatings applied by methods described herein can exhibit superior corrosion, scale, and wear resistance. Further, the coatings of the invention can avoid reduction of the inside diameter and effective cross-sectional area of a pipe. Compared to concrete linings, the coatings described herein can provide substantial space and weight savings. Compared to plastic linings, the coatings described herein can provide wear resistance and increase the lifespan of a pipe or tube. Fine-structured coatings with porosity or graded porosity can also exhibit controlled wetting or permeability behavior. Compared to techniques such as sol-gel deposition, the coating systems and methods described herein can provide improved adhesion properties, mechanical strength, and hardness.

The disclosure describes systems and methods of accelerating aerosolized powder particles to high velocities, and impacting powder particles on the inside surface of a hollow structure to coat the inside surface of the hollow structure. In some embodiments, the method disclosed herein builds a coating with a thin layer of material that is less than 1 micron thick inside a hollow structure, for example, a tube. In some embodiments, the method disclosed herein builds a coating with a thick layer of material that is more than 1 micron thick inside a hollow structure. The systems and methods disclosed herein can be used to coat the inner surface of a hollow structure with, for example, a rectangular, square, or elliptical cross-section. In some embodiments, the systems and methods disclosed herein can be used to coat the inner surface of a hollow structure with one closed end.

In some embodiments, the method disclosed herein builds a coating inside a hollow structure with a layer of material that is about 0.1 µm, about 0.2 µm, about 0.3 µm, about 0.4 µm, about 0.5 µm, about 0.6 µm, about 0.7 µm, about 0.8 µm, about 0.9 µm, or about 1 µm thick. In some embodiments, the method disclosed herein builds a coating with a layer of dense material inside a hollow structure that is about 2 µm, about 5 µm, about 10 µm, about 15 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, or about 100 µm thick. In some embodiments, the methods disclosed herein builds a coating with a layer of dense material inside a hollow structure that is about 100 µm, about 200 µm, about 300 µm, about 400 µm, about 500 µm, about 600 µm, about 700 µm, about 800 µm, about 900 µm, or about 1000 µm thick. In some embodiments, multiple layers of coating can be deposited onto an inner surface of a hollow structure, for example, a tube.

A dense, fine-structured coating (e.g., a brittle material such as a ceramic coating) can be used to provide protection for a hollow structure made of different materials. In some embodiments, the hollow structure, for example, a tube or a pipe is made of metal. In some embodiments, the hollow structure, for example, a tube or a pipe, is made of cast iron, ductile iron, steel, galvanized steel, stainless steel, a superalloy (e.g., Inconel®, Hastelloy®), rigid copper, flexible copper, brass, aluminum, or titanium. In some embodiments, the hollow structure can be made of plastic. In some embodiments, the hollow structure is made of acrylonitrile-butadiene-styrene (ABS), polymethyl methacrylate (acrylic; PMMA), polyvinyl chloride (PVC), unplasticized polyvinyl chloride (UPVC), post-chlorinated polyvinyl chloride (CPVC), polybutylene (PB-1), polypropylene (PP), polyethylene (PE), cross-linked polyethylene (PEX), polyvinylidene fluoride (PVDF), or polyethylene of raised temperature resistance (PE-RT). In some embodiments, the hollow structure is made of ceramic or clay. In some embodiments, the hollow structure is made of advanced ceramics, for example, pure or doped alumina, mullite, zirconia, or titania. In some embodiments, the hollow structure is made of glass, such as borosilicate, soda-lime, aluminosilicate, or fused silica glass. In some embodiments, the hollow structure is made of a composite material, fiber-glass, fiber-reinforced epoxy, cermet, or glass-ceramic.

Upon being deposited inside a hollow structure (e.g., a tube or a pipe), the dense, fine-structured coating (e.g., a brittle material such as ceramic) can provide protection for the hollow structure during use. The dense, fine-structured coating can provide advantages in scratch resistance, wear resistance, corrosion resistance, thermal resistance, scale resistance, and chemical resistance. In some embodiments, surface texturing on nanometer and micrometer length scales can enhance the hydrophobicity of the surface, and deter the adhesion of bio-foulants and nucleation of mineral crystals. In some embodiments, surface texturing on nanometer and micrometer length scales can enhance the hydrophilicity of the surface, and enhance permeability of porous filter layers. The fine-structured and porous coating (e.g., a brittle material such as a ceramic coating) on the inside of the hollow structure can be utilized as a catalytic coating.

A coating of the disclosure can have little to no internal porosity. In some embodiments, the produced coating can have about 10%, about 20%, about 30%, about 40, or about 50% porosity. The methods and systems of the disclosure can produce ceramic and composite coatings ranging from amorphous to crystalline structures. In some embodiments, the coatings are near 0% crystalline, about 10% crystalline, about 20% crystalline, about 30% crystalline, about 40% crystalline, about 50% crystalline, about 60% crystalline, about 70a % crystalline, about 80% crystalline, about 90% crystalline, or about 100% crystalline.

FIG. 1 illustrates a coating process using a tubular workpiece (1) as a vacuum chamber. A coating (2) is deposited onto the inside wall of the tubular workpiece via kinetic impact of aerosolized particles (3). The coating can comprise the aerosolized particles or fractured pieces of the aerosolized particles. A gas under positive pressure carries particles (3) of the material to be deposited onto a tube or pipe by an aerosolizing mechanism (13). The aerosolizing mechanism (13) is supplied with a carrier gas by a carrier gas source (12). The carrier gas can impart an elevated pressure into the aerosol carrying tube (8). The aerosol carrying tube (8) transports aerosolized particles (3) into the pipe or tube (1) that is to be coated. The pipe or tube (1) is sealed using temporary sealing mechanisms (4) to maintain a full or partial air-tight seal using gaskets (5). Non-limiting examples of temporary sealing mechanisms include seals, gaskets, o-rings, etc. The tube or pipe (1) is placed under negative pressure by evacuating the tube or pipe using a negative pressure source (14) through an exhaust pathway (11). A negative pressure source can be, for example, a vacuum. Deposition occurs on the inside wall of the tubular workpiece via kinetic impact of aerosolized particles.

A nozzle (7) is placed within the tube or pipe (1) to be coated. The nozzle has a nozzle outlet that is located, for example, from about 1 mm to about 40 mm from an inner surface of the tube or pipe. In this example, the nozzle (7) is oriented perpendicularly to the section of the tube or pipe (1) to be coated. The coating (2) is deposited onto the inner surface of the sealed pipe or tube (1) according to an orientation of the nozzle (7), which is placed in a nozzle mount (6). The orientation of the nozzle includes a position and/or an angular orientation. The nozzle (7) and nozzle mount (6) can be directed by manipulating the nozzle support rod (9). The nozzle (7) can rotate freely around the central axis of the tube or pipe (1) to be coated. The nozzle support rod (9) can move along the length of the sealed pipe or tube (1) via movement through the nozzle support rod feed (10) along the Z-axis of movement. The nozzle support rod (9) can also rotate along a central axis (0). The axis of rotation of the nozzle can be used to coat a 360° swath of coating on the inner surface of the pipe or tube (1). The ability of the nozzle support rod to move along the Z axis and central axis allows for control of the direction of aerosol deposition. The coating can be deposited onto the entire exposed inner surface area of the pipe or tube wall.

Figure 2:
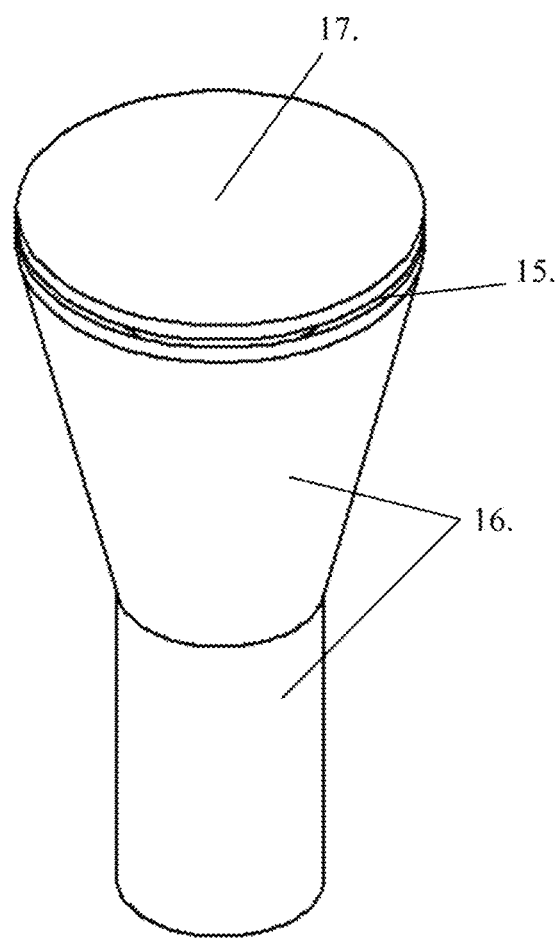

The method described herein can be performed to apply a coating on the surface of the inside wall of a hollow structure. The method described herein does not require the use of an external vacuum chamber for AD, and can use the hollow structure to be coated as the vacuum chamber (FIG. 2). An example system comprises:

i) a system to evacuate a length of a hollow structure (e.g., pipe or tubing), including a high-volume vacuum system, a hose to connect the high-volume vacuum system and the hollow structure, and a sealing mechanism for the two ends of the hollow structure;
ii) a powder-aerosol generating device, connected to a carrier gas supply, and valves to control the flow of the carrier gas;
iii) plumbing to transport the aerosolized powder to a nozzle inside the hollow structure;
iv) a nozzle designed to direct the aerosolized powder at high-speed onto the inside surface of the hollow structure;
v) a mechanism for translation and rotation of the pipe or the nozzle system;
vi) a support structure for parts i)-v); and
vii) a computer and code to control the motion of the nozzle and/or pipe or a set of controls to allow for manual control of the nozzle or pipe.

The system described herein can optionally include one or more parts. In some embodiments, the system can comprise more than one nozzle. In some embodiments, the system can comprise a sensor to monitor the aerosol concentration within the hollow structure. In some embodiments, the system comprises a sensor to monitor the temperature within the hollow structure. In some embodiments, the system comprises a camera to monitor visually the coating deposition. In some embodiments, the system incorporates a sensor to monitor the thickness of a coating. In some embodiments, the system incorporates a vortex filter to collect excess powder that has not been deposited to the surface of the hollow structure. In some embodiments, the system can incorporate a vortex filter to collect excess powder that has not been deposited to the surface of the hollow structure.

The system described herein can deposit a film or coating onto the inner surface of a hollow structure at an elevated temperature, room temperature, or a temperature below room temperature. In some embodiments, the system of the disclosure can deposit a coating onto the inner surface of a hollow structure at room temperature.

A system described herein can comprise a radial nozzle with a circumferential or partial circumferential slit for projecting particles in a range of angles from 0 degrees to 360 degrees around a longitudinal axis of the hollow structure toward the internal surface of the hollow structure. In some embodiments, the nozzle can be a unidirectional nozzle with a circular, elliptical, square, slit, or other cross-sectional area that has 360 degree rotational motion. In some embodiments, the nozzle can have transverse motion with respect to the longitudinal axis of the hollow structure. The distance between an outlet of the nozzle and an inner surface of the hollow structure can be adjusted. In some embodiments, a rocking motion can be used to adjust the angle of incidence for particles impacting the inner surface of the hollow structure. The nozzle system can be moved relative to the longitudinal axis of the hollow structure. In some embodiments, the hollow structure to be coated can be moved axially relative to a fixed nozzle system.

Movement of the nozzle can take place via a combination of bearings and linear stepper motors. In some embodiments, the pipe is translated along a rail system. In some embodiments, the nozzle can spray the aerosol powder 360° around a longitudinal axis of the hollow structure in a radial fashion. In some embodiments, the pipe is fixed, and the nozzle system and the flexible plumbing are capable of both linear translation and 360° rotation. Motion of the nozzle system can be controlled via programmable control boards and a computer. Motion of the nozzle can also be controlled manually.

A system of the disclosure can be used to coat the inner surface of a hollow structure with a large diameter. The nozzle can move radially around the longitudinal axis of a section of the hollow structure such that aerosol deposition can be performed with the central axis of the deposition apparatus located at a position away from the center of the section of the hollow structure to be coated. In some embodiments, the nozzle can move in, around, or through the central axis of the hollow structure such that deposition can be performed with the nozzle system moving along the inner surface of the pipe. In some embodiments, aerosol deposition can be performed away from the central axis of the section of hollow structure to be coated. A system of the disclosure can also manipulate the orientation of a nozzle outlet with respect to the inner surface of a hollow structure to any offset or manipulate the orientation such that any desired cleaning or deposition operation can be achieved on any size or shape of pipe. In some embodiments, a system of the disclosure can be used to coat the inner surface of a hollow structure with a non-circular cross sectional shape.

The aerosolized powder can be generated in a variety of ways, for example, the powder can be flowed onto a porous substrate within a cylindrical aerosol chamber. The cylindrical aerosol chamber can have a shaker mechanism and flow-through carrier gas inlet from the bottom of the aerosol chamber, which creates a fluidized bed. The fine powder particles are elevated upward and into a flexible tube. In some embodiments, the cylindrical aerosol chamber operates in batches. In some embodiments, the aerosol chamber can hold about 10 g, about 20 g, about 30 g, about 40 g, about 50 g, about 60 g, about 70 g, about 80 g, about 90 g, or about 100 g of a powder. In some embodiments, the aerosol chamber can hold about 100 g, about 200 g, about 300 g, about 400 g, about 500 g, about 600 g, about 700 g, about 800 g, about 900 g, or about 1000 g of a powder. In some embodiments, the aerosol chamber can hold about 1 kg, about 1.5 kg, about 2 kg, about 2.5 kg, about 3 kg, about 3.5 kg, about 4 kg, about 4.5 kg, or about 5 kg of a powder. In some embodiments, the cylindrical aerosol chamber operates continuously. A commercially available aerosol generator can be used to generate an aerosolized powder.

The disclosed system can deposit materials or composite materials to the inside of a hollow structure by accelerating the particles, for example, to high (e.g., near-sonic) speeds. Acceleration of the particles in the aerosol occurs by the pressure difference (ΔP) between the aerosol chamber and the deposition chamber (i.e., pipe or tube). In some embodiments, the device accelerates the ceramic particles to about 100 m/sec, about 125 m/sec, about 150 m/sec, about 175 m/sec, about 200 m/sec, about 225 m/sec, about 250 m/sec, about 275 m/sec, about 300 m/sec, about 325 m/sec, about 350 m/sec, about 375 m/sec, or about 400 m/sec. In some embodiments, the device accelerates particles to about 500 m/sec, about 600 m/sec, about 700 m/sec, about 800 m/sec, about 900 m/sec, or about 1000 m/sec. In some embodiments, the device accelerates particles from about 100 m/sec to about 500 m/sec. In some embodiments, the device accelerates particles from about 100 m/sec to about 1000 m/sec.

In some embodiments, ΔP is about 10 kPa, about 20 kPa, about 30 kPa, about 40 kPa, about 50 kPa, about 60 kPa, about 70 kPa, about 80 kPa, about 90 kPa, about 100 kPa, about 150 kPa, about 200 kPa, about 250 kPa, or about 300 kPa. In some embodiments, ΔP is about 10 kPa to about 100 kPa. In some embodiments, ΔP is about 10 kPa to about 300 kPa.

In some embodiments, the disclosed system can deposit a coating onto the inner surface of a hollow structure at rate of about 100 μm·mm$^2$/min (thickness×area per min), about 200 μm·mm$^2$/min, about 300 μm·mm$^2$/min, about 400 μm·mm$^2$/min, about 500 μm·mm$^2$/min, about 600 μm·mm$^2$/min, about 700 μm·mm$^2$/min, about 800 μm·mm$^2$/min, about 900 μm·mm$^2$/min, or about 1000 μm·mm$^2$/min. In some embodiments, the system can deposit a coating onto the inner surface of a hollow structure at a rate of about 2000 μm·mm$^2$/min, about 3000 μm·mm$^2$/min, about 4000 μm·mm$^2$/min, about 5000 μm·mm$^2$/min, about 6000 μm·mm$^2$/min, about 7000 μm·mm$^2$/min, about 8000 μm·mm$^2$/min, about 9000 μm·mm$^2$/min, about 10000 μm·mm$^2$/min, about 11000 μm·mm$^2$/min, about 12000 μm·mm$^2$/min, about 13 μm·mm$^2$/min, about 14000 μm·mm$^2$/min, about 15000 μm·mm$^2$/min, about 16000 μm·mm$^2$/min, about 17000 μm·mm$^2$/min, about 18000 μm·mm$^2$/min, about 19000 μm·mm$^2$/min, or about 20000 μm·mm$^2$/min.

The disclosed system can deposit a coating on an inner surface of a hollow structure that is about 1 inch, about 2 inches, about 3 inches, about 4 inches, about 5 inches, about 6 inches, about 7 inches, about 8 inches, about 9 inches, about 10 inches, about 11 inches, about 12 inches, about 13 inches, about 14 inches, about 15 inches, about 16 inches, about 17 inches, about 18 inches, about 19 inches, or about 20 inches in diameter. In some embodiments, the disclosed system can deposit a coating to a hollow structure that is about 1 ft, about 2 ft, about 3 ft, about 4 ft, or about 5 ft in diameter. The disclosed system can be adapted to any size of a hollow structure or multiple sizes of hollow structures.

The coated hollow structure can be subjected to post-deposition processing. In some embodiments, the hollow structure can be subjected to cooling. In some embodiments, the hollow structure can be subjected to heating. In some embodiments, the hollow structure can be subjected to drying using air or an inert gas, or subjected to a reaction using a reactive gas.

The disclosed invention can use a variety of materials for deposition of a film or coating comprising ceramics, such as borides, carbides, silicides, nitrides, oxides, halides, pnictogenides (e.g., phosphides, arsenides), or chalcogenides (e.g., sulfides and selenides), and semi-metals (e.g., C, Si, Ge, Sn) to coat the inside of a hollow structure, for example, a tube or a pipe. In some embodiments, the coating (e.g., a brittle material such as a ceramic coating) can be selected from zirconium oxide, aluminum oxide (alumina), titanium oxide, chrome oxide, boric oxide, magnesium oxide, silicon dioxide (silica), yttrium oxide, cerium oxide, or other rare-earth oxides, aluminum nitride, silicon nitride, silicon carbide, alone or in any combination thereof. In some embodiments, the ceramic film or coating can be a complex oxide, carbide, nitride, oxy-nitride, or carbo-nitride. The ceramic can be pure or doped. In some embodiments, aluminum oxide ($Al_2O_3$) and/or titanium dioxide ($TiO_2$) can be used to coat pipes to achieve corrosion and abrasion resistance. In some embodiments, a hydrophobic coating like selenium, or a rare earth oxide (e/g/. CeO) can be deposited onto the surface of a pipe to achieve hydrophobic, anti-scaling or anti-fouling properties. A ceramic coating like $TiO_2$ can be deposited onto the inner surface of a hollow structure to achieve hydrophilic, wetting behavior.

In some embodiments, the disclosed invention can comprise two or more different materials. In some embodiments, a coating comprises ceramic-ceramic, ceramic-metal, or ceramic-polymer combinations. In some embodiments, a coating comprises two or more ceramic materials selected from carbides, nitrides, oxides, or chalcogenides (e.g., sulfides and selenides), semi-metals, zirconium oxide, aluminum oxide (alumina), titanium dioxide, chrome oxide, boric oxide, magnesium oxide, silicon dioxide (silica), yttrium oxide, cerium oxide, other rare-earth oxides, aluminum nitride, silicon nitride, and silicon carbide.

In some embodiments, a ceramic coating comprises two ceramic materials (e.g., Ceramic A and Ceramic B), and the ceramic coating formulation is about 10% Ceramic A/about 90% Ceramic B by volume, about 20% Ceramic A/about 80% Ceramic B by volume, about 30% Ceramic A/about 70% Ceramic B by volume, about 40% Ceramic A/about 60% Ceramic B by volume, about 50% Ceramic A/about 50% Ceramic B by volume, about 60% Ceramic A/about 40% Ceramic B by volume, about 70% Ceramic A/about 30% Ceramic B by volume, about 80% Ceramic A/about 20% Ceramic B by volume, or about 90% Ceramic A/about 10% Ceramic B by volume.

In some embodiments, a coating comprises a ceramic material and a metal, such as nickel, cobalt, or copper. In some embodiments, a coating comprises a ceramic material and a metal (i.e., cermet), and the coating formulation is about 10% ceramic/about 90% metal by volume, about 20% ceramic/about 80% metal by volume, about 30% ceramic/about 70% metal by volume, about 40% ceramic/about 60% metal by volume, about 50% ceramic/about 50% metal by volume, about 60% ceramic/about 40% metal by volume, about 70% ceramic/about 30% metal by volume, about 80% ceramic/about 20% metal by volume, or about 90% ceramic/about 10% metal by volume.

In some embodiments, the coating (e.g., a brittle material such as a ceramic coating) is a ceramic-polymer composite material, wherein the polymer component is a plastic such as Teflon® (PTFE), PMMA, PE, PP, PS, or PVC. In some embodiments, a composite coating comprises a ceramic-polymer composite material with a formulation of about 10% ceramic/about 90% polymer by volume, about 20% ceramic/about 80% polymer by volume, about 30% ceramic/about 70% polymer by volume, about 40% ceramic/about 60% polymer by volume, about 50% ceramic/about 50% polymer by volume, about 60% ceramic/about 40% polymer by volume, about 70% ceramic/about 30% polymer by volume, about 80% ceramic/about 20% polymer by volume, or about 90% ceramic/about 10% polymer by volume.

In some embodiments, the powders used for deposition can be processed before being used for deposition. In some embodiments, ceramic powders can be milled to an average particle size of about 0.1 μm in diameter, about 0.2 μm in diameter, about 0.3 μm in diameter, about 0.4 μm in diameter, about 0.5 μm in diameter, about 0.6 μm in diameter, about 0.7 μm in diameter, about 0.8 μm in diameter, about 0.9 μm in diameter, or about 1 μm in diameter. In some embodiments, ceramic powders can be milled to an average particle size of about 1 μm in diameter, about 2 μm in diameter, about 3 μm in diameter, about 4 μm in diameter, about 5 μm in diameter, about 6 μm in diameter, about 7 μm in diameter, about 8 μm in diameter, about 9 μm in diameter, or about 10 μm in diameter. Fine ceramic milling can take place in a planetary mill, vibratory mill, attritor mill, or a similar machine. In some embodiments, composite coatings are used for deposition, and the power components of the composite coating are thoroughly mixed and milled in an appropriate mixing apparatus. In some embodiments, the powder components of a composite coating can be mixed and milled using a ball mill or a paddle mixer.

Applications

The systems and methods disclosed herein can be used in the oil and gas industry, where pipe coatings are widely used for the smooth transportation of hydrocarbons. In some embodiments, nanostructured coating of the invention can be used in the tubing of chemical processing plants, oil and gas wellbore tubing, transport piping, cooling systems, and waste systems. Ceramic or ceramic composite pipe coatings in the oil and gas industry could help increase the lifetime of the piping system and reduce replacement costs. In some embodiments, the coatings disclosed herein can be used for process piping inside furnaces of refineries, which can run mixtures of petroleum fluids and solid catalysts at elevated temperatures around 1000° F. to 1600° F. (535° C. to 870° C.). In some embodiments, the coating of the invention can be used to coat the inside of wellbore piping used for hydraulic fracturing to mitigate scale buildup.

The systems and methods of the disclosure can also be used in photobioreactors (PBRs). Tubular PBR designs utilize large lengths of borosilicate glass tubes, generally ranging from 10 mm to 60 mm in diameter, and are suitable for large scale, outdoor mass cultivation of micro-algae. Eventual adhesion of algae to internal tube surfaces requires regular mechanical cleaning to maintain sufficient light transparency. In some embodiments of the invention, a hydrophobic coating is used to maintain laminar flow within the tubing, reduce adhesion and bio-fouling on glass walls, thus reducing maintenance costs.

The systems and methods of the disclosure can also be used for gun barrel bores and cylinder bores in piston engines, where a ceramic or ceramic composite coating can help to reduce friction and wear, protecting metallic surfaces from thermal and mechanical degradation. The systems and methods of disclosure can further be used for tubular solid oxide fuel cells and oxygen gas sensors, where ceramic and ceramic composite electrodes are applied to internal surfaces of dense, stabilized zirconia tubes for electronic conduction and catalyzing the reduction of oxygen gas.

EXAMPLES

Example 1

Tube coating apparatus using a 360 degree radial spray head with linear (axial) translation of the tube.

A model tube coating apparatus using a 360 degree radial spray head with linear translation of the tube is disclosed herein. The model tube coating apparatus using a 360 degree radial spray head is used for coating pipes or tubes with inner diameters of about 1.5 to 2 inches.

FIG. 2 shows an isometric view of a radial nozzle that can be used in the coating process. The nozzle is designed so that the outlet of the nozzle (15) allows for aerosolized particles to exit the nozzle such that the aerosol particles disperse 360 degrees around the nozzle simultaneously as the radial nozzle is moved along the length of the pipe or tubing to be coated. The nozzle comprises upper (17) and lower (16) sections. The lower section of the nozzle contains the nozzle inlet. The upper and lower sections of the nozzle combine to form the nozzle outlet (15).

Figure 3:
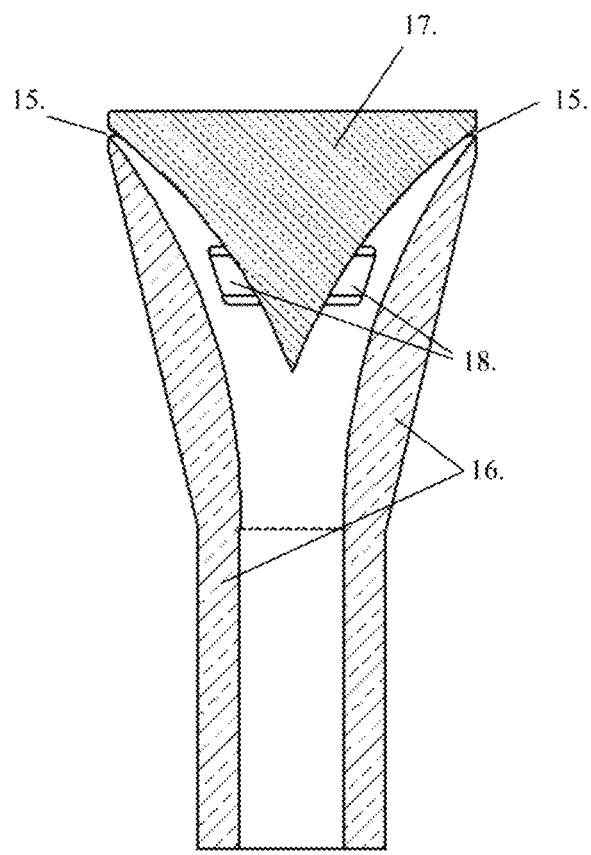

FIG. 3 shows a cross-sectional view of a radial nozzle that can be used in the coating process. The radial nozzle consists of a hollow inner section that can be attached to a tube carrying aerosol particles. The stream of aerosol particles passing through the nozzle separates the flow of the aerosol particles such that the aerosol particles disperses 360 degrees around the nozzle. Inner support structures (18) positioned at an angular distances around the central axis of the radial nozzle allows for the upper portion (17) of the nozzle to be attached to the lower portion (16) of the nozzle while maintaining regular flow of the aerosol particles from the nozzle. The upper section of the nozzle can be removable. Aerosol particles entering the nozzle from the inlet of the lower section (16) are forced by the geometry of the nozzle to exit the nozzle outlet (15) as a full stream such that the particles can disperse 360 degrees around the nozzle. The internal supports (18) are positioned far enough within the lower section (16) of the nozzle that the supports do not disrupt the flow of the aerosol particles as the particles diverge and exit the nozzle at the outlet (15) formed between the upper section (17) and lower section (16) of the nozzle.

Figure 4:
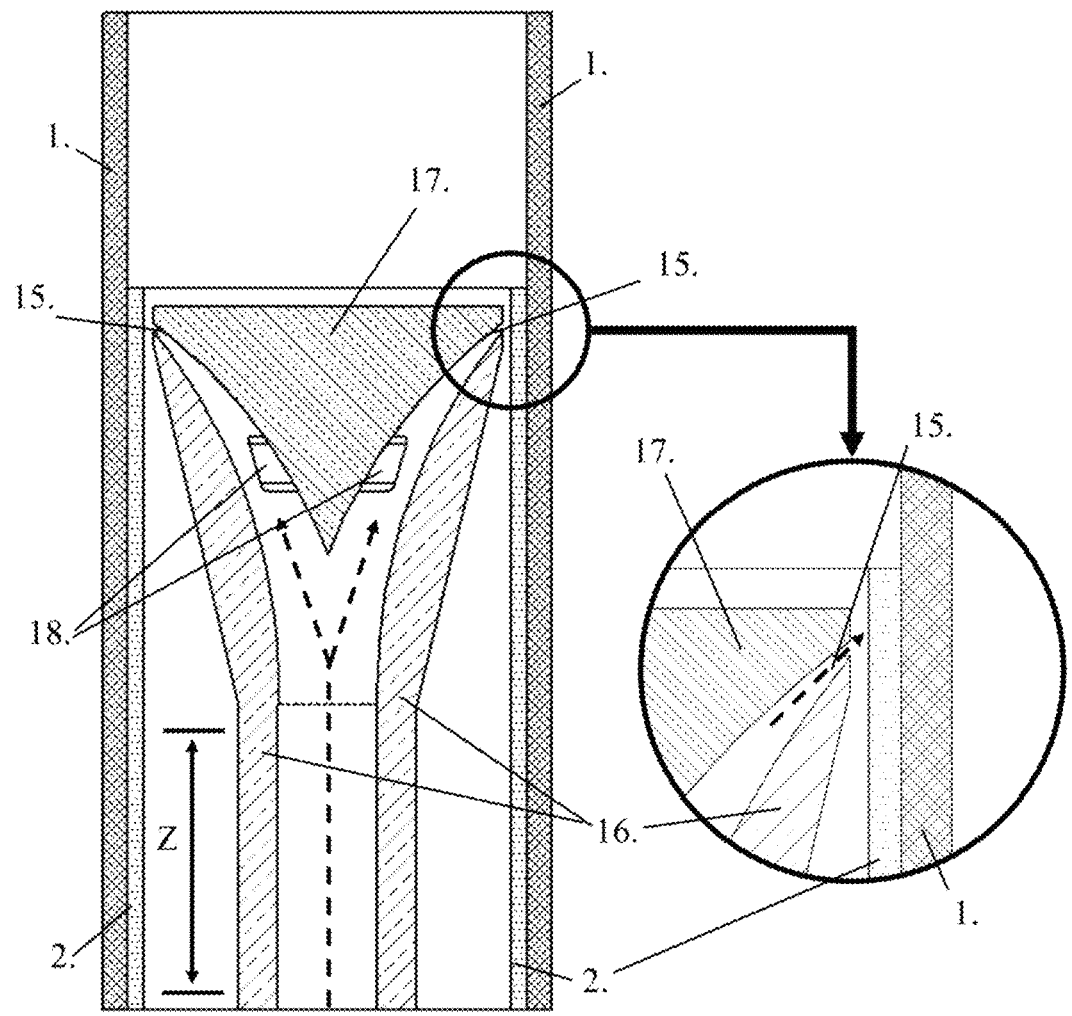

FIG. 4 shows a cross-sectional view of a radial nozzle that can be used in the coating process. The nozzle is placed inside a tube or pipe for full deposition, or a section of a tube or pipe for partial deposition. The nozzle comprises a lower section (16) that contains the nozzle inlet, and an upper section (17) that, when combined with the lower section (16), forms a 360° nozzle outlet (15). The nozzle design permits deposition of material to occur 360 degrees around the nozzle simultaneously as the radial nozzle is moved along the length of a pipe or tube. The upper section (17) is held in place with the lower section (16) by multiple internal supports (18) positioned at regular angular distances around the central axis of the radial nozzle. Aerosol particles entering the nozzle from the inlet of the lower section (16) are forced by the geometry of the nozzle to diverge into a full 360° stream when exiting the nozzle outlet (15). The internal supports (18) are positioned far enough within the lower section (16) of the nozzle such that the internal supports (18) do not disrupt the flow of the aerosol particles as the particles diverge and exit the nozzle at the outlet (15) formed between the upper section (17) and lower section (16) of the nozzle. The dashed lines in FIG. 4 indicate the pathway of aerosol particles when the particles pass through the radial nozzle. The dashed line in the magnified section of the drawing indicate the pathway of the aerosol particles when exiting the radial nozzle, impacting the inner surface of the pipe or tube (1) and subsequently forming a coating (2). The translation direction of the nozzle (Z) along the length of the pipe or tube or section of pipe or tube (1) that is utilized by the embodiment to coat a 360° longitudinal swath is indicated by a double ended arrow along the (Z) axis.

Example 2: Tube Coating Apparatus Using a Unidirectional Spray Nozzle with 360 Degree Rotational and Linear (Axial) Translation Along the Length of a Fixed Tube A model tube coating apparatus using a unidirectional spray nozzle linear, Z-axis (axial) translation and with 360 degree rotation in a plane perpendicular to Z is designed to coat pipes of tubes that are 2 inches in diameter or larger.

Figure 5:
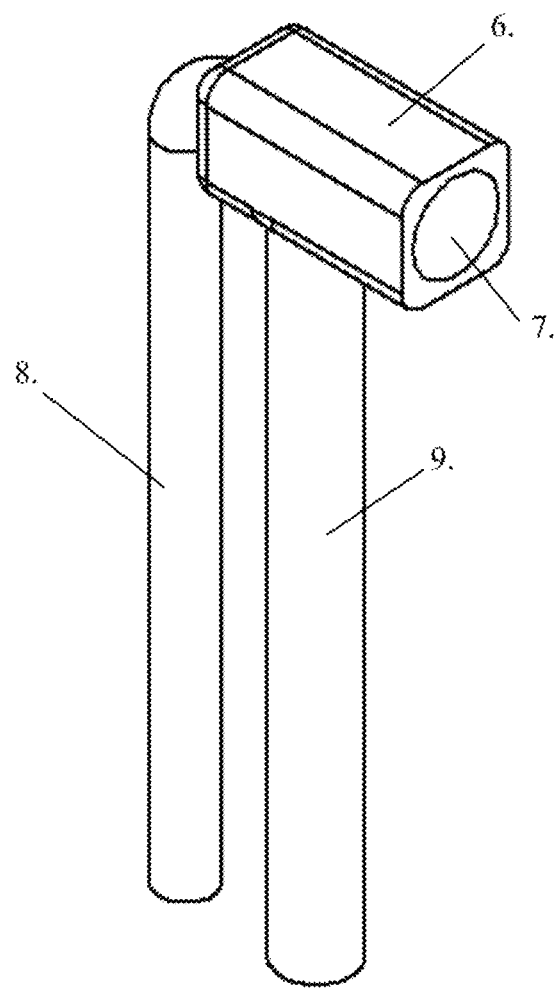

FIG. 5 shows an isometric view of a fixed nozzle that can be used in the coating process. A nozzle mount (6) comprising a nozzle (7) is fixed perpendicularly to a support rod (9). A tube carrying a flow of aerosolized particles (8) is attached at the end of the nozzle mount (6), opposite the nozzle (7) outlet.

Figure 6:
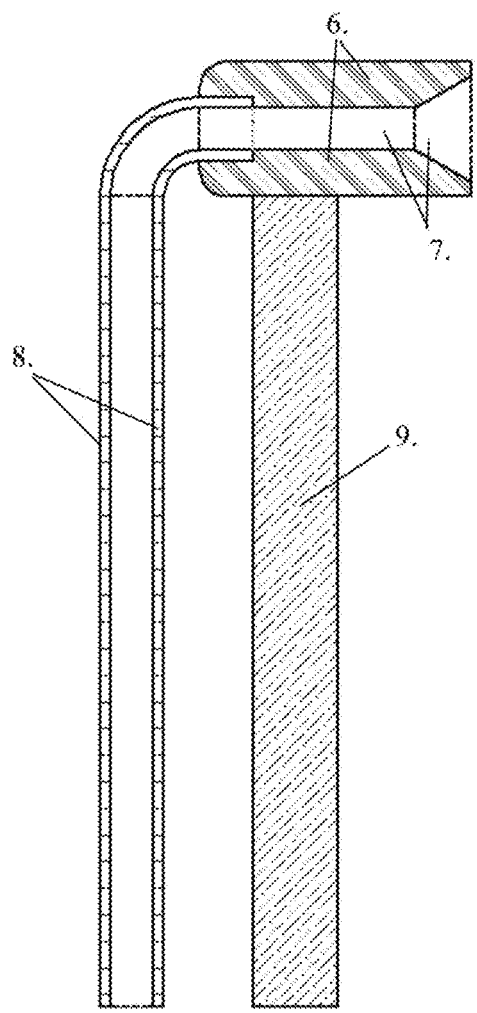

FIG. 6 shows a cross-sectional view of a fixed nozzle that can be used in the coating process. A nozzle mount (6) comprising a nozzle (7) is oriented and affixed perpendicular to a longitudinal axis of a support rod (9). A tube carrying a stream of aerosolized particles (8) used in the deposition process is attached to the back of the nozzle mount (6), opposite the nozzle (7) outlet.

Figure 7:
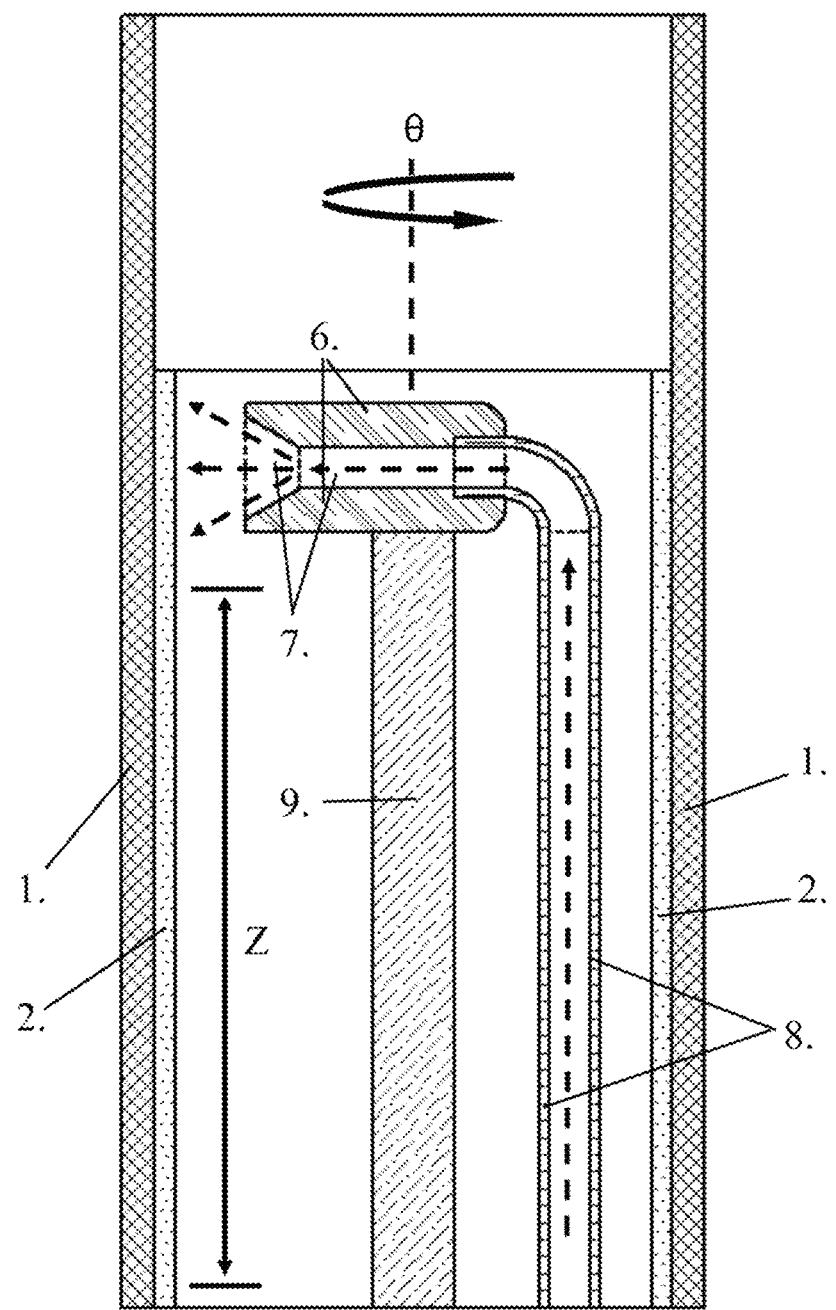

FIG. 7 shows a cross-sectional view of a fixed nozzle placed inside a tube or pipe (1) for full deposition, or a section of a tube or pipe for partial deposition. The deposition apparatus comprises a nozzle mount (6) containing a nozzle (7) that is oriented perpendicular to a longitudinal axis of a nozzle support rod (9). A tube (8) carrying a flow of aerosol particles is attached at the end of the nozzle mount (6), opposite the nozzle (7) outlet. The dashed arrows indicate the path of the aerosolized particles as the particles move through the inner cavity of the aerosol particle carrying tube (8) and through the nozzle (7) inside the nozzle mount (6), where the aerosol particles impact the inner surface of the section of tubing to form a coating (2). The nozzle can rotate freely around the central axis of the tube or pipe undergoing deposition. This axis of rotation (0) can be used to coat a 360° swath of the inner surface of the pipe or tube. The nozzle can shift along the length of the tube or pipe or section of tube or pipe as required. This translation direction is illustrated in the diagram by a double ended arrow marked with a Z.

Example 3: Coating Apparatus Using a Unidirectional Spray Nozzle with Capability for Variable Stand-Off Distance, Variable Angle of Incidence, and 360 Degree Rotational and Linear (Axial) Translation Along the Length of a Fixed Tube A model coating apparatus using a unidirectional spray nozzle with 360 degree rotational and linear translation is developed to coat the inner surfaces of pipes or tubes that are 2 inches in diameter or larger. The coating apparatus uses a unidirectional spray nozzle that allows for 360 rotational and linear translation movement. The coating apparatus also accommodates variable stand-off distances between the nozzle orifice and tube wall, and variable incident angles. The coating apparatus is capable of moving the nozzle with four degrees of motion: Translation parallel to the axis of the tube (Z-axis); angular (Q) rotation in a plane perpendicular to the Z-axis; translation perpendicular to the Z-axis (radial translation); and angular (φ) rotation in a plane parallel to Z.

Figure 8:
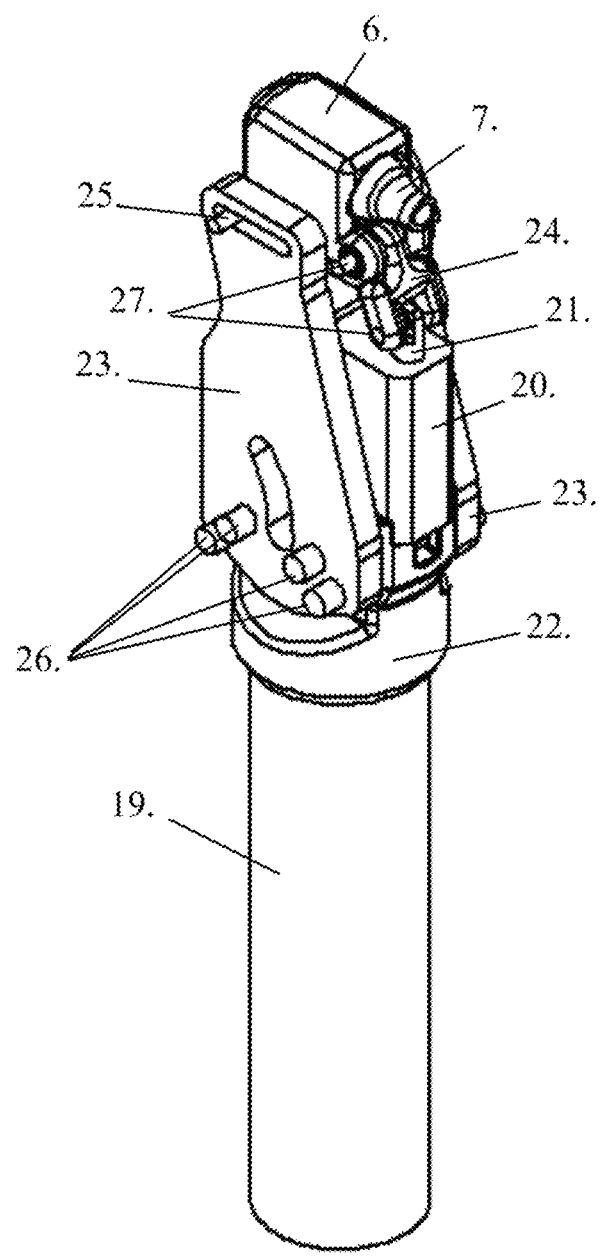

FIG. 8 shows an isometric front-side view of an embodiment of the coating apparatus that is capable of moving a nozzle (7) in four degrees of motion. A nozzle mount (6) containing a nozzle (7) is held in position by an offset sliding pin (25) at the end of the nozzle mount (6), opposite the nozzle (7) outlet. The offset sliding pin (25) is inserted into grooves in two mounting plates (23) that are positioned on the sides of the nozzle mount (6). The portion of the nozzle mount (6) closest to the nozzle (7) outlet is held in position by an angle adjustment link (24), which is secured by a link retention pin (27). The angle adjustment link (24) is also attached to a linear actuation piston (21) inside a linear actuation mechanism (20), and the linear actuation piston (21) is secured with a second link retention pin (27). The two mounting plates (23) are secured to a linear actuation mechanism mount (22) by four nozzle mounting plate retention pins (26). The linear actuation mechanism mount (22) is in turn mounted onto a nozzle support pipe (19).

Two linear actuation mechanisms (20) positioned in parallel with a lower section of support tubing (19) can manipulate two linkages (24, 28; not shown). When the two linkages are manipulated, the nozzle housing (6) is moved through a range of motion that is restricted by the position of a pin (25) at the end of the nozzle housing (6) opposite the nozzle (7) outlet. The dimensions of the linkages are such that when the actuation mechanism to the rear of the nozzle (7) outlet is extended, the nozzle housing (6) is shifted forward. Restriction of the sliding pin (25) at the end of the nozzle housing (6) opposite to the nozzle (7) outlet allows for adjustment of the angle of the nozzle via extension of the actuation mechanism (20) closest to the nozzle (7) outlet. As a result, both the radial offset of the nozzle (7) from the inner surface of the pipe or tubing and the angular orientation with which the nozzle (7) directs the flow of aerosol against the surface to be coated can be accurately adjusted through the controlled extension or retraction of said actuation mechanisms. Aerosolized particles are carried through a tube that runs through the support tube out the side of the actuation mechanism mount (22), and connects to the rear of the nozzle housing (6) unit.

Figure 9:
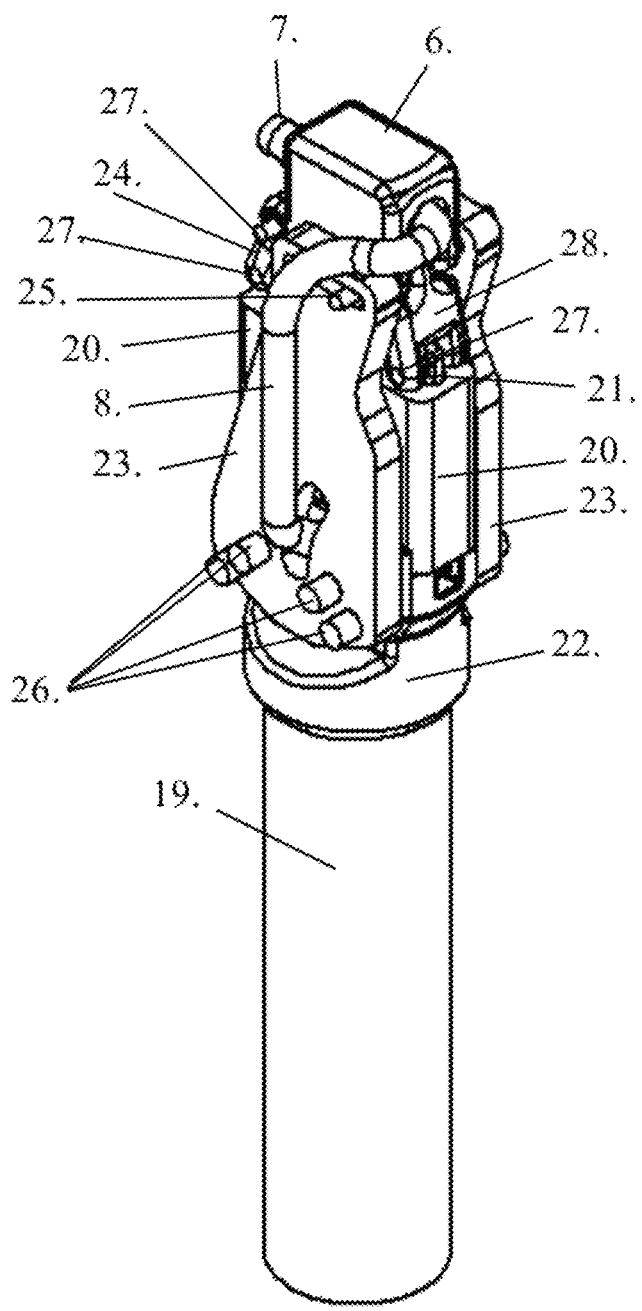

FIG. 9 shows an isometric back-side view of an embodiment of the coating apparatus that is capable of moving a nozzle (7) in four degrees of motion. A nozzle mount (6) containing a nozzle (7) is held in position by an offset sliding pin (25) installed at the end of the nozzle mount (6) opposite the nozzle (7) outlet. Grooves are placed in two mounting plates (23), which are positioned on either side of the nozzle mount (6). The offset sliding pin (25) is attached to an offset adjustment link (28), which is subsequently attached via a link retention pin (27). The link retention pin (27) is further attached to a linear actuation piston (21) that is mounted to a linear actuation mechanism (20). The portion of the nozzle mount (6) closest to the nozzle (7) outlet is held in position by an angle adjustment link (24) secured by a link retention pin (27). The angle adjustment link (24) is also attached to the linear actuation piston (21) inside the linear actuation mechanism (20), and is secured by a second link retention pin (27). Two mounting plates (23) are secured to a linear actuation mechanism mount (22) by four nozzle mounting plate retention pins (26). The linear actuation mechanism mount (22) is in turn mounted onto a nozzle support pipe (19). An aerosol carrying tube (8) is introduced from the side of the linear actuation mechanism mount (22) and passes through a curved slit in one of the nozzle mounting plates (23). The carrying tube (8) is then introduced to the end of the nozzle mount (6) opposite the nozzle (7) outlet.

Figure 10:
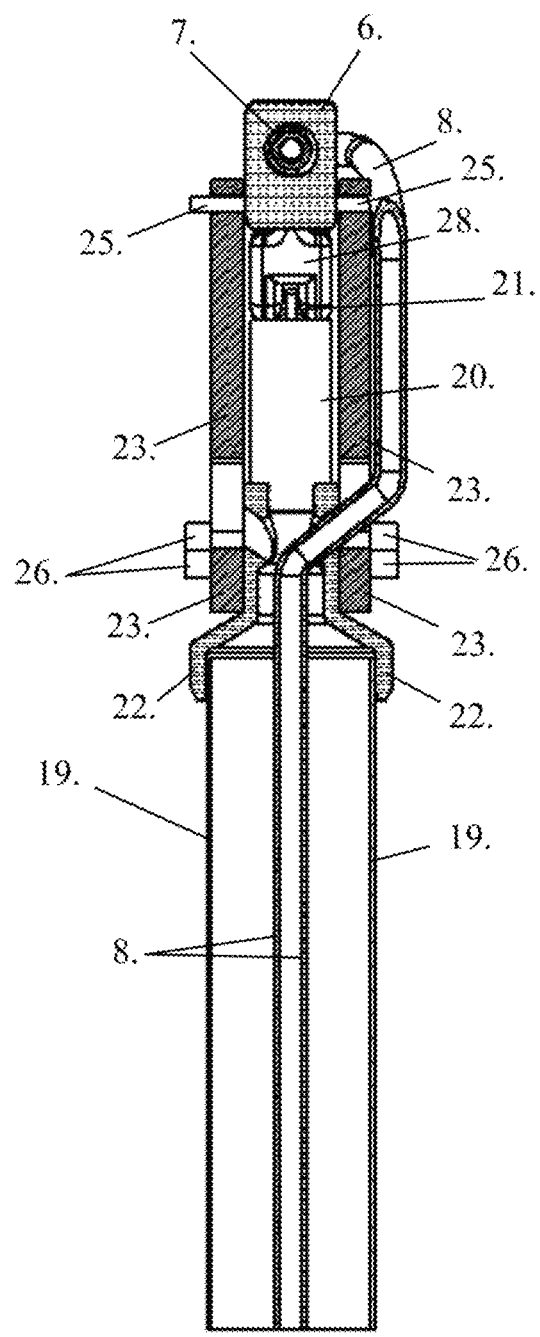

FIG. 10 shows a cross-sectional front-side view of an embodiment of the coating apparatus that is capable of moving a nozzle (7) in four degrees of motion. The cutaway drawing is oriented perpendicular to the direction the nozzle (7). The outlet is facing such that the coating apparatus is divided between the two linear actuation mechanisms (20). The nozzle mount (6) is held in position by an offset sliding pin (25) at the end of the nozzle mount (6), opposite the nozzle (7) outlet. The nozzle (7) is inserted into grooves in two mounting plates (23) positioned on either side of the nozzle mount (6). The portion of the nozzle mount (6) closest to the nozzle (7) outlet is held in position by an angle adjustment link (24). The angle adjustment link (24) is also attached to a linear actuation piston (21) inside a linear actuation mechanism (20). The two mounting plates (23) are secured to a linear actuation mechanism mount (22) by four nozzle mounting plate retention pins (26). The linear actuation mechanism mount (22) is in turn mounted onto a nozzle support pipe (19). The aerosol carrying tube (8) is introduced from the side of the linear actuation mechanism mount (22), passed through a curved slit in one of the nozzle mounting plates (23), and introduced to the end of the nozzle mount (6) opposite the nozzle (7) outlet. A tube (8) running up the center of the support tube (19) is utilized to carry aerosolized particles to the nozzle mount (6) at the top of the apparatus.

Figure 11:
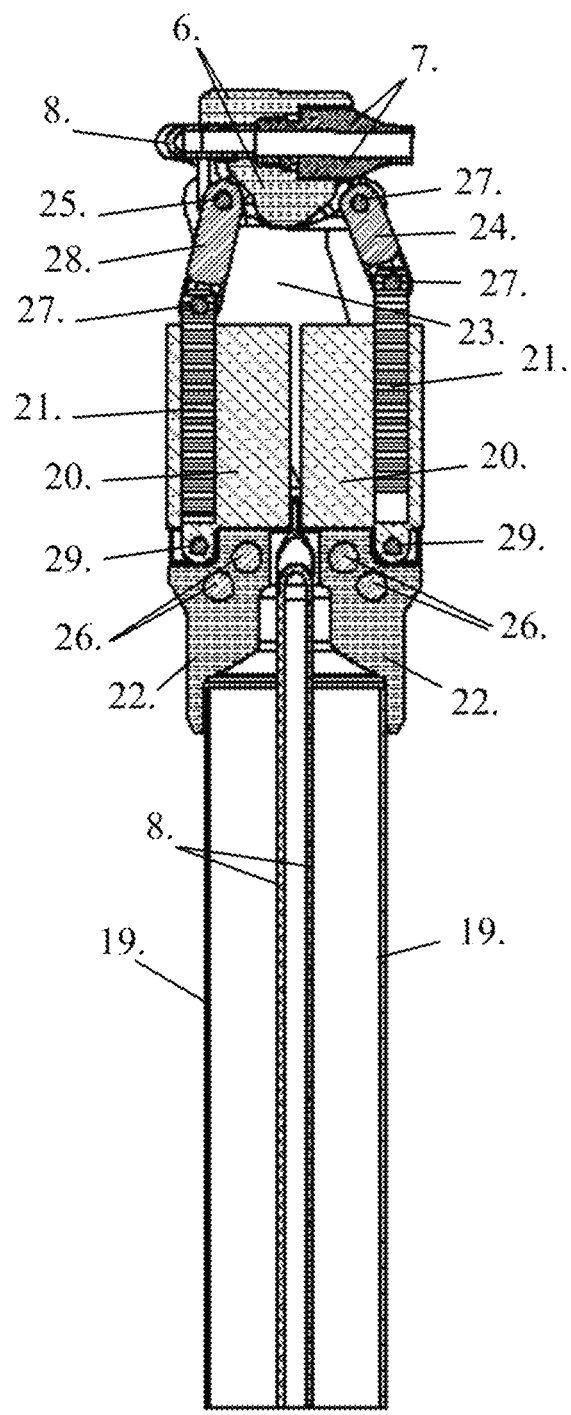

FIG. 11 shows a cross-sectional side-view of an embodiment of the coating apparatus that is capable of moving a nozzle (7) in four degrees of motion. A nozzle mount (6) containing a nozzle (7) is held in position by an offset sliding pin (25) at the end of the nozzle mount (6) opposite the nozzle (7) outlet. The nozzle mount (6) is inserted into grooves in two mounting plates (23) positioned on either side of the nozzle mount (6). The offset sliding pin (25) is also attached to an offset adjustment link (28) that is subsequently attached via a link retention pin (27) to a linear actuation piston (21), which is mounted in a linear actuation mechanism (20). The portion of the nozzle mount (6) closest to the nozzle (7) outlet is held in position by an angle adjustment link (24) secured by a link retention pin (27). The angle adjustment link (24) is also attached to a linear actuation piston (21) inside a linear actuation mechanism (20) and is secured by a second link retention pin (27). The two mounting plates (23) are secured to a linear actuation mechanism mount (22) by four nozzle mounting plate retention pins (26). The linear actuation mechanism mount (22) is in turn mounted onto a nozzle support pipe. An aerosol carrying tube (8) is introduced from the side of the linear actuation mechanism mount (22), passed through a curved slit in one of the nozzle mounting plates (23), and introduced to the end of the nozzle mount (6) opposite the nozzle (7) outlet.

Figure 12:
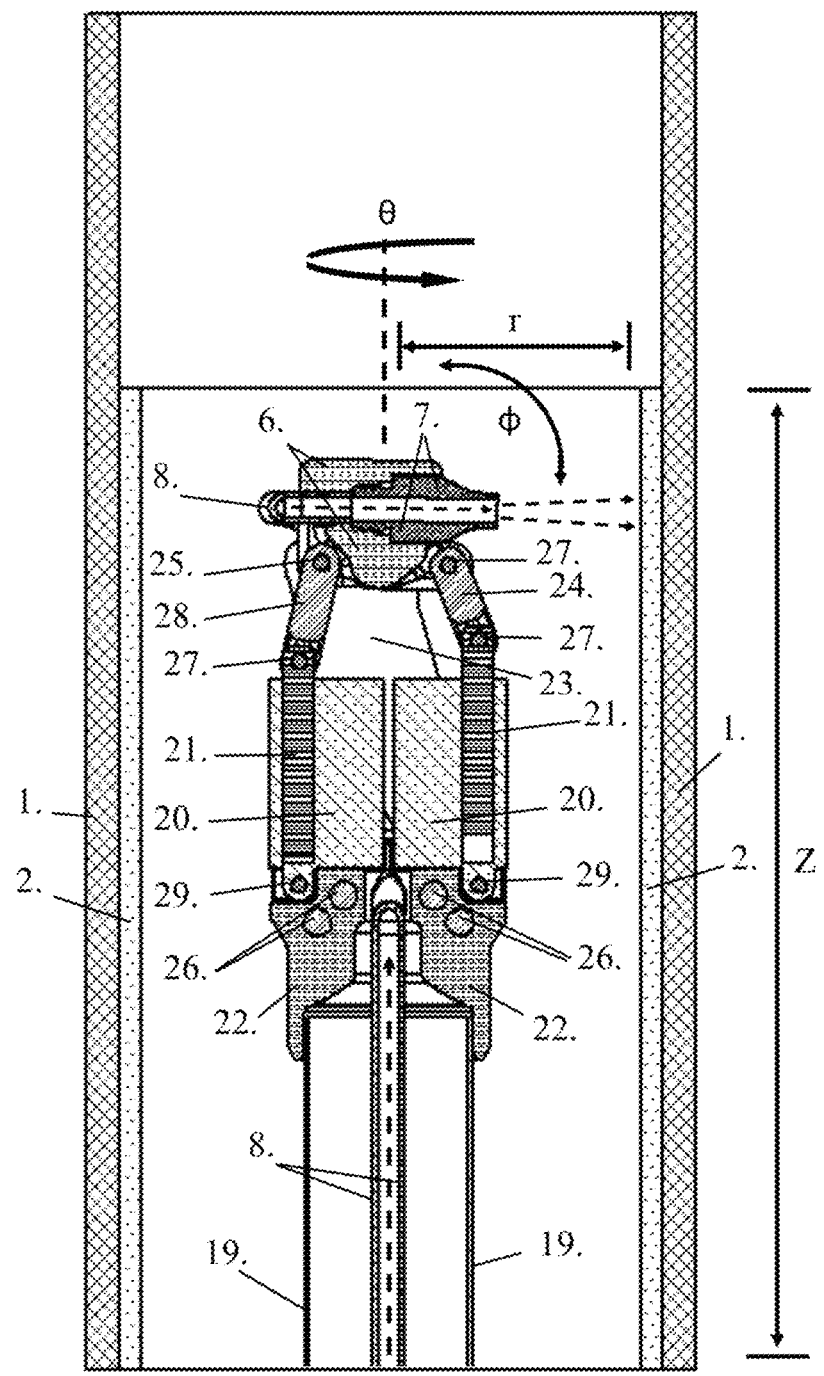

FIG. 12 shows a cross-sectional side-view of an embodiment of the coating apparatus that is capable of moving a nozzle (7) in four degrees of motion when placed inside a section of tubing. The coating apparatus is shown inside a pipe or tube (1) that has undergone partial deposition to form a deposited coating (2) on the inner surface of the pipe or tube (1). A nozzle mount (6) containing a nozzle (7) is held in position by an offset sliding pin (25) at the end of the nozzle mount (6) opposite the nozzle (7) outlet, and is inserted into grooves in two mounting plates (23) positioned on either side of the nozzle mount (6). The offset sliding pin (25) is also attached to an offset adjustment link (28) that is subsequently attached via a link retention pin (27) to a linear actuation piston (21) mounted to a linear actuation mechanism (20). The portion of the nozzle mount (6) closest to the nozzle (7) outlet is held in position by an angle adjustment link (24) secured by a link retention pin (27). The angle adjustment link (24) is also attached to a linear actuation piston (21) inside a linear actuation mechanism (20) and is secured by a second link retention pin (27).

The two mounting plates (23) are secured to a linear actuation mechanism mount (22) by four nozzle mounting plate retention pins (26). The linear actuation mechanism mount (22) is in turn mounted onto a nozzle support pipe (19). An aerosol carrying tube (8) is introduced from the side of the linear actuation mechanism mount (22), passed through a curved slit in one of the nozzle mounting plates (23), and introduced to the end of the nozzle mount (6) opposite the nozzle (7) outlet. The two linear actuation mechanisms (20) allow for alterations to be made to the angle of the nozzle (7) with respect to a longitudinal axis of the pipe or tube (1) and to a radial offset of the nozzle (7) from the inner surface of the pipe or tube or section of pipe or tube (1). When the linear actuation mechanism (20) located closest to the nozzle (7) outlet is extended or retracted, the nozzle orientation is shifted to an angle greater than 90° from perpendicular with the inner surface of the pipe or tube or section of pipe or tube (1). Extension or retraction of the nozzle (7) is accomplished via the linear actuation piston (21). The linear actuation mechanism acting on the angle adjustment link (24) tilts the nozzle mount (6) and subsequently the nozzle (7) from its horizontal orientation.

When the linear actuation mechanism (20) located farthest from the nozzle (7) outlet is extended or retracted, the nozzle offset is shifted such that the nozzle (7) is moved closer to the inner surface of the pipe or tube (1). Extension or retraction of the linear actuation mechanism is accomplished via the linear actuation piston (21). The linear actuation mechanism acts on the offset adjustment link (24) to push the offset sliding pin (25) in the nozzle mount (6) and subsequently the nozzle (7) towards the inner surface of the pipe or tube (1). As a result of the linear actuation mechanisms (20), the restriction of the links (24, 28), and the groove in the nozzle mounting plates (23), the radial offset of the nozzle (7) from the inner surface of the pipe or tube (1) and the angle with which the nozzle (7) directs the flow of aerosol against the inner surface of the pipe or tube (1) can be accurately adjusted through the controlled extension or retraction of the actuation mechanisms (20).

The dashed arrows in FIG. 12 indicate the path of the aerosolized particles as the particles move through the apparatus and impact with the inner surface of the pipe or tube (1). The axis of rotation that the nozzle (7) can revolve around can be utilized to lay down a 360° swath on the inner surface of the pipe or tube (1). The axis of rotation of the nozzle is illustrated by a curved arrow marked with a θ. The coating apparatus can shift along the length of the tube or pipe (1). The translational direction can be utilized to lay down a longitudinal swath of material on the inner surface of the pipe or tube (1). The translational direction of the coating apparatus and is illustrated by a double ended arrow marked with a Z. The radial offset translation direction can be used to alter the distance between the outlet of the nozzle (7) and the inner surface of the pipe or tube (1), as shown using a double ended arrow marked with an r. The radial offset is not always perpendicular to the inner wall of the pipe or tube (1) to be coated. The radial offset direction is proportionate to the angle at which the nozzle (7) is positioned from perpendicular to the inner wall of the pipe or tube (1) to be coated. The incident angle of the nozzle (7) can be adjusted to change the angle with which aerosol particles impact the inner surface of the pipe or tube (1) is marked with a φ.

Example 4: Coating Apparatus to Coat the Inner Surface of a Large-Diameter Pipe or Tube An apparatus that is capable of moving a nozzle in an orbit around or through the central axis of a section of pipe or tubing is prepared. The coating apparatus can move along the inner surface of the pipe or tubing such that deposition is performed away from the central axis of the section of pipe or tubing in which deposition is occurring.

Figure 13:
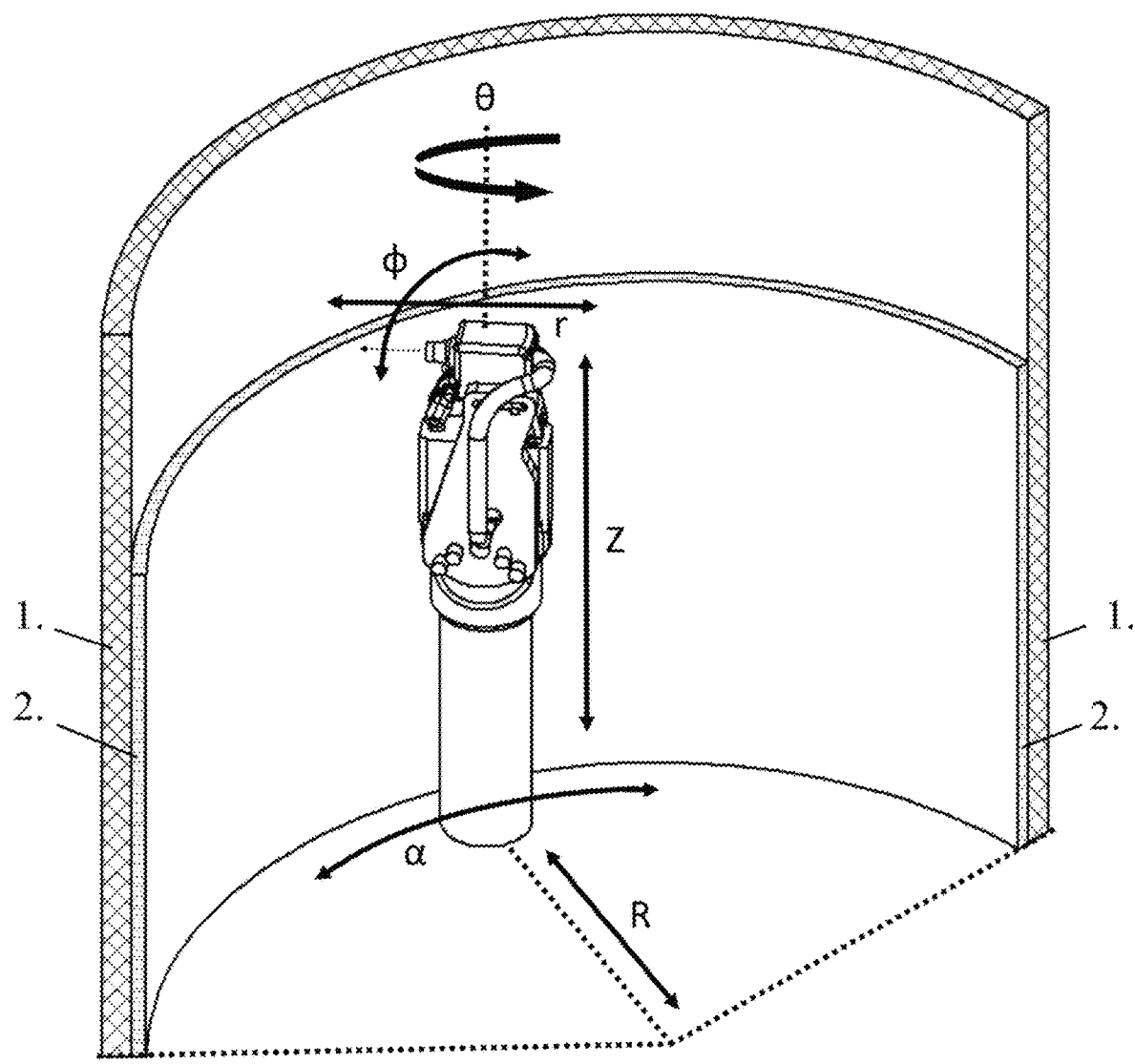

FIG. 13 shows a coating apparatus in a cutaway of a large section of pipe or tubing (1) that has undergone partial deposition to form a deposited coating (2). The arrows in FIG. 13 indicate the axis of movement of the coating device. The axis of motion can be: a) radial to the center of the section of pipe or tubing (1) undergoing deposition; b) circumferential along the inner perimeter of the section of pipe or tubing (1) undergoing deposition; c) linear along the length of the section of pipe or tubing (1) undergoing deposition; d) minutely radial according to the direction of the aerosol deposition apparatus; e) along a vertical arc according to the direction the nozzle of the aerosol deposition apparatus; or f) rotational along the central axis of the aerosol deposition apparatus.

The axis of rotation of the coating device of FIG. 13 can coat a 360° swath of the inner surface of the pipe or tube (1), which is illustrated by a curved arrow marked with a θ. The coating device can move along the length of a pipe or tube (1) to coat a longitudinal swath of the inner surface of a pipe or tube (1), as illustrated by the arrow marked with a Z. The radial offset translation of the nozzle from the central axis of the nozzle mount can be used to change the distance between the inner surface of the pipe or tube and the nozzle outlet (r). The radial offset can be either perpendicular or non-perpendicular to the inner wall of the pipe or tube (1) in which deposition is occurring. The radial offset direction is proportionate to the angle at which the nozzle is positioned from perpendicular to the inner wall of the pipe or tube (1) in which deposition is occurring. The incident angle (φ) is used to adjust the angle at which the aerosolized particles impact the inner surface of the pipe or tube (1). The offset of the coating apparatus from the central axis of the section of pipe or tubing that the coating apparatus is within is indicated by a double headed arrow marked with an (R). The angle of rotation around the central axis of the pipe or tubing (1) that the coating apparatus is within can be used to coat a 360° swath of the inner surface of the pipe or tube (1), and is indicated by a curved double headed arrow marked α.

Figure 14:
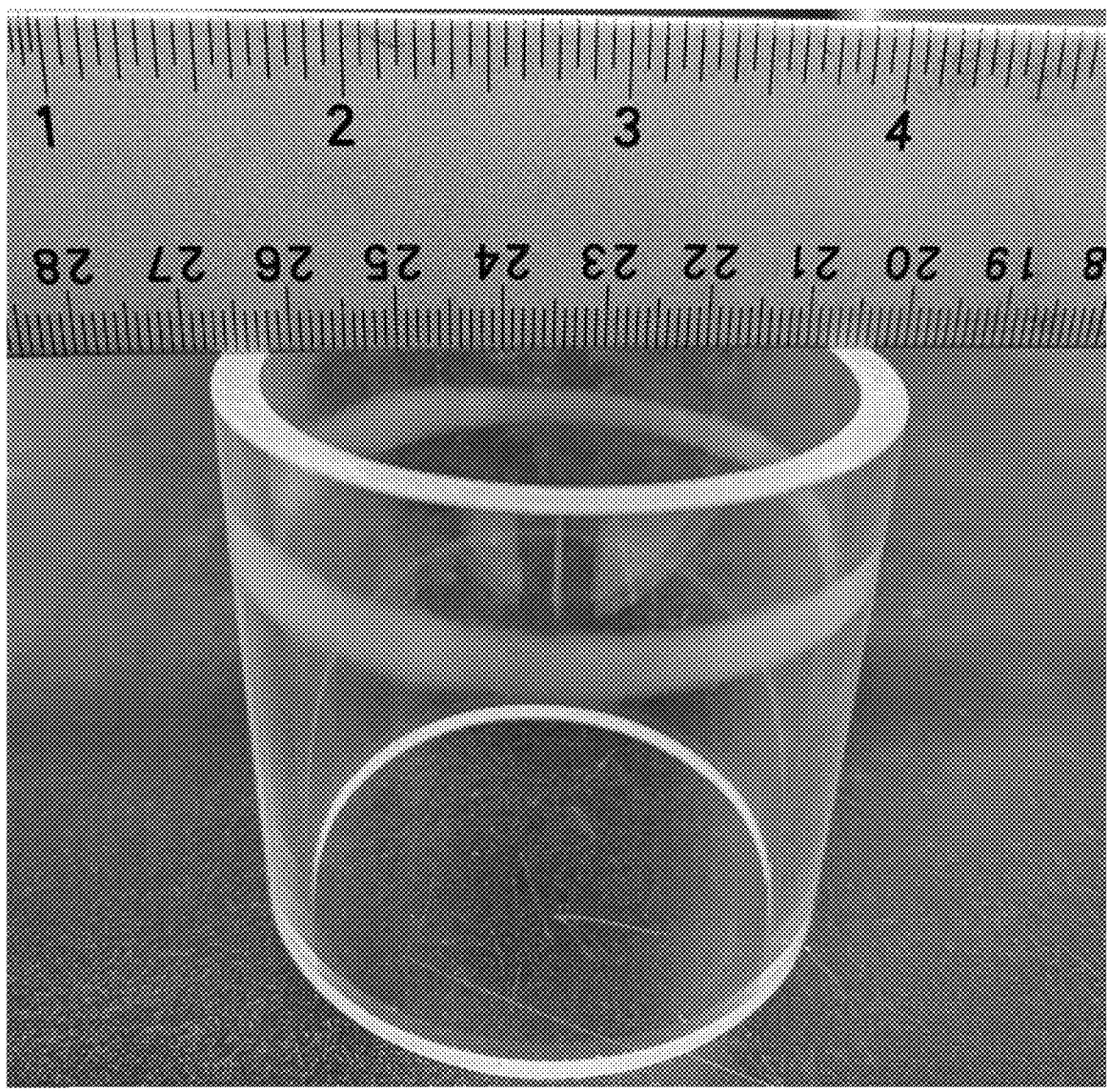

Example 5: Coating the Inside of a Glass Pipe with $TiO_2$ Using a Coating Apparatus of the Disclosure FIG. 14 shows a $TiO_2$ coating on the inner surface of a 2 inch diameter borosilicate glass pipe using a coating apparatus of the disclosure. The $TiO_2$ film was deposited using the apparatus described in EXAMPLE 3. The inside pipe pressure was about 0.4 kPa, and the aerosol chamber pressure was about 100 kPa. The powder particle size was <0.5 micron, and the stand-off distance was about 4 mm. The deposition took place at room temperature, and the sample was not treated after deposition thermally or otherwise. The band of $TiO_2$ was about 2 micron thick, and was scratch resistant.

Figure 15:
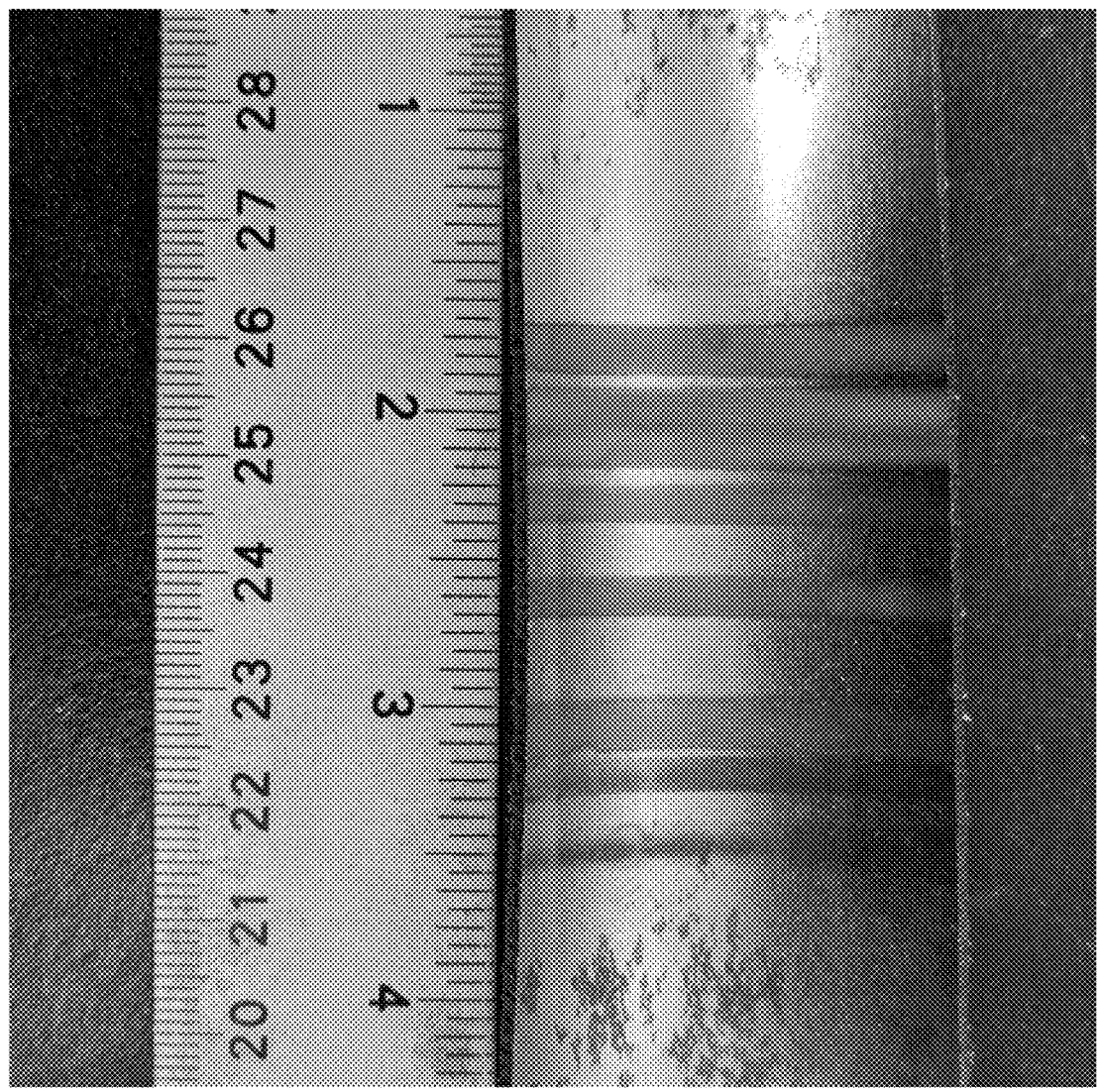

Example 6: Coating the Inside of a Steel Pipe with $TiO_2$ Using a Coating Apparatus of the Disclosure $TiO_2$ bands were deposited onto the inner surface of a steel pipe using the coating apparatus of EXAMPLE 3. FIG. 15 shows several bands of $TiO_2$ ceramic coating on the inside of a 2 inch diameter steel pipe. The inside pipe pressure was about 0.4 kPa, and the aerosol chamber pressure was about 100 kPa. The powder particle size was <0.5 micron, and the stand-off distance was about 5 mm. Different bands were produced using a different number of total passes (rotations), ranging from 2 to 5. The depositions took place at room temperature, and the sample was not treated thermally or otherwise. The steel pipe was sectioned following deposition to reveal the deposited films. The presence of multiple bands demonstrates the ability for translating the nozzle mechanism along the length of the pipe, and varying the film thickness (e.g., thick to thin from top to bottom). The sample also demonstrates the ability of TiO2 to protect a steel sample from corrosion upon being exposed to a humid atmosphere over a long period of time. Corrosion products (i.e., rust) was visible in non-coated regions of the pipe surface. All $TiO_2$ films were scratch resistant.

EMBODIMENTS

The following non-limiting embodiments provide illustrative examples of the invention, but do not limit the scope of the invention.

Embodiment 1

A method comprising: 1) inserting an outlet into a tube, wherein the outlet is connected to a container containing powder particles, wherein the tube is connected to a vacuum pump, wherein the container is connected to a source of a carrier gas, wherein the container is connected to the outlet by a gas line; 2) creating a reduced pressure atmosphere inside the tube using the vacuum pump; 3) transferring the powder particles from the container to the outlet, wherein the carrier gas transfers the powder particles from the container to the outlet by the gas line based on a differential in pressure between the source of the carrier gas and the reduced pressure atmosphere inside the tube; and 4) depositing the powder particles onto an inner surface of the tube via the outlet.

Embodiment 2

The method of embodiment 1, wherein the outlet comprises a circumferential slit.

Embodiment 3

The method of embodiment 1 or 2, wherein the outlet comprises a partial circumferential slit.

Embodiment 4

The method of any one of embodiments 1-3, wherein the container has an internal atmosphere difference that has a higher pressure than the reduced pressure atmosphere inside the tube.

Embodiment 5

The method of any one of embodiments 1-4, wherein the inner surface of the tube and an outlet are about 1 mm to about 40 mm apart in distance.

Embodiment 6

The method of any one of embodiments 1-5, wherein the powder particles exit the outlet at a speed of about 100 m/sec to about 1000 m/sec.

Embodiment 7

The method of any one of embodiments 1-6, wherein the reduced pressure atmosphere inside the tube is about 10 kPa to about 300 kPa less than an internal pressure of the container.

Embodiment 8

The method of any one of embodiments 1-7, wherein the powder particles deposited onto the inner surface of the tube form a coating at the inner surface of the tube.

Embodiment 9

The method of any one of embodiments 1-8, wherein the powder particles are micron-sized particles.

Embodiment 10

The method of any one of embodiments 1-8, wherein the powder particles are sub-micron-sized particles.

Embodiment 11

The method of any one of embodiments 1-10, wherein the powder particles are ceramic powder particles.

Embodiment 12

The method of embodiment 11, wherein the ceramic power particles comprise aluminum oxide.

Embodiment 13

The method of embodiment 11, wherein the ceramic powder particles comprise titanium dioxide.

Embodiment 14

The method of embodiment 11, wherein the ceramic powder particles comprise a rare earth oxide.

Embodiment 15

The method of any one of embodiments 1-11, wherein the powder particles are a mixture of ceramic particles and metal particles.

Embodiment 16

The method of any one of embodiments 1-11, wherein the powder particles are a mixture of ceramic particles and polymeric particles.

Embodiment 17

The method of any one of embodiments 8-16, wherein the coating is a ceramic coating.

Embodiment 18

The method of any one of embodiments 8-17, wherein the coating is less than about 1 micron in thickness.

Embodiment 19

The method of any one of embodiments 8-17, wherein the coating is greater than about 1 micron in thickness.

Embodiment 20

The method of any one of embodiments 8-19, wherein the coating is a porous coating.

Embodiment 21

The method of any one of embodiments 8-19, wherein the coating comprises variable density.

Embodiment 22

The method of any one of embodiments 1-21, wherein the tube is a pipe.

Embodiment 23

The method of any one of embodiments 1-22, wherein the tube is a metal pipe.

Embodiment 24

The method of any one of embodiments 1-22, where in the tube is a glass pipe.

Embodiment 25

The method of any one of embodiments 1-22, wherein the tube is a polymeric pipe.

Embodiment 26

The method of any one of embodiments 1-22, wherein the tube is a composite pipe.

Embodiment 27

The method of any one of embodiments 1-26, further comprising cleaning the inner surface of the tube by abrasive particle blasting before depositing the powder particles onto the inner surface of the tube.

Embodiment 28

A system comprising: 1) a tube, wherein: a) a first end of the tube is connected to a vacuum pump by a first seal; and b) a second end of the tube is blocked by a second seal; 2) a nozzle, wherein the nozzle is connected to an inlet, wherein the inlet is introduced through the second seal; 3) a container containing powder particles, wherein the inlet is connected to the container; and 4) a carrier gas source, wherein the container and the carrier gas source are connected by a gas line.

Embodiment 29

The system of embodiment 28, wherein the nozzle comprises a circumferential slit.

Embodiment 30

The system of embodiment 28 or 29, wherein the nozzle comprises a partial circumferential slit.

Embodiment 31

The system of any one of embodiments 28-30, wherein the nozzle is configured to move relative to a longitudinal axis of the tube.

Embodiment 32

The system of any one of embodiments 28-31, wherein the nozzle is configured to move axially and rotationally through the tube.

Embodiment 33

The system of any one of embodiments 28-32, wherein the nozzle is configured to move around a central axis of the tube.

Embodiment 34

The system of any one of embodiments 28-33, wherein the nozzle is configured for 360 degrees of rotational motion.

Embodiment 35

The system of any one of embodiments 28-34, wherein the nozzle is configured for rotation through an angle in a plane parallel to an axis of the tube.

Embodiment 36

The system of any one of embodiments 28-35, wherein the nozzle is about 1 mm to about 40 mm away from an inner surface of the tube.

Embodiment 37

The system of any one of embodiments 28-36, wherein the powder particles are micron-sized particles.

Embodiment 38

The system of any one of embodiments 28-36, wherein the powder particles are sub-micron-sized particles.

Embodiment 39

The system of any one of embodiments 28-38, wherein the powder particles are ceramic powder particles.

Embodiment 40

The system of any one of embodiments 28-39, wherein the powder particles comprise aluminum oxide.

Embodiment 41

The system of any one of embodiments 28-40, wherein the powder particles comprise titanium dioxide.

Embodiment 42

The system of any one of embodiments 28-41, wherein the powder particles comprise a rare earth oxide.

Embodiment 43

The system of any one of embodiments 28-42, wherein the powder particles comprise a mixture of ceramic particles and metal particles.

Embodiment 44

The system of any one of embodiments 28-43, wherein the powder particles comprise a mixture of ceramic particles and polymer particles.

Embodiment 45

The system of any one of embodiments 28-44, wherein the powder particles flow from the aerosol powder generator into the tube through the nozzle.

Embodiment 46

The system of any one of embodiments 28-45, wherein the powder particles exit the nozzle a rate of about 100 m/sec to about 1000 m/sec.

Embodiment 47

The system of any one of embodiments 28-46, wherein the vacuum pump creates a reduced pressure atmosphere inside the tube that is about 10 kPa to about 300 kPa less than an internal pressure of the container.

Embodiment 48

The system of any one of embodiments 28-47, wherein the tube is a pipe.

Embodiment 49

The system of any one of embodiments 28-48, wherein the tube is a metal pipe.

Embodiment 50

The system of any one of embodiments 28-48, wherein the tube is a glass pipe.

Embodiment 51

The system of any one of embodiments 28-48, wherein the tube is a polymeric pipe.

Embodiment 52

The system of any one of embodiments 28-48, wherein the tube is a composite pipe.

What is claimed is:
1. A method comprising:
   1) inserting an outlet into a tube, wherein the outlet is connected to a container containing powder particles, wherein the tube is connected to a vacuum pump, wherein the container is connected to a source of a carrier gas, wherein the container is connected to the outlet by a gas line;
   2) creating a reduced pressure atmosphere inside the tube using the vacuum pump;
   3) transferring the powder particles from the container to the outlet, wherein the carrier gas transfers the powder particles from the container to the outlet by the gas line based on a differential in pressure between the source of the carrier gas and the reduced pressure atmosphere inside the tube; and 4) depositing the powder particles onto an inner surface of the tube via the outlet.

2. The method of claim 1, wherein the outlet comprises a radial nozzle.

3. The method of claim 1, wherein the outlet comprises a uni-directional nozzle.

4. The method of claim 1, wherein the container has an internal atmosphere difference that has a higher pressure than the reduced pressure atmosphere inside the tube.

5. The method of claim 1, wherein the inner surface of the tube and an outlet are about 1 mm to about 40 mm apart in distance.

6. The method of claim 1, wherein the powder particles exit the outlet at a speed of about 100 m/sec to about 1000 m/sec.

7. The method of claim 1, wherein the reduced pressure atmosphere inside the tube is about 10 kPa to about 300 kPa less than an internal pressure of the container.

8. The method of claim 1, wherein the powder particles deposited onto the inner surface of the tube form a coating at the inner surface of the tube.

9. The method of claim 8, wherein the coating is a ceramic coating.

10. The method of claim 8, wherein the coating is less than about 1 micron in thickness.

11. The method of claim 8, wherein the coating is greater than about 1 micron in thickness.

12. The method of claim 8, wherein the coating is a porous coating.

13. The method of claim 8, wherein the coating comprises variable density.

14. The method of claim 1, wherein the powder particles are micron-sized particles.

15. The method of claim 1, wherein the powder particles are sub-micron-sized particles.

16. The method of claim 1, wherein the powder particles are ceramic powder particles.

17. The method of claim 16, wherein the ceramic power particles comprise aluminum oxide.

18. The method of claim 16, wherein the ceramic powder particles comprise titanium dioxide.

19. The method of claim 16, wherein the ceramic powder particles comprise a rare earth oxide.

20. The method of claim 1, wherein the powder particles are a mixture of ceramic particles and metal particles.

21. The method of claim 1, wherein the powder particles are a mixture of ceramic particles and polymeric particles.

22. The method of claim 1, wherein the tube is a pipe.

23. The method of claim 1, wherein the tube is a metal pipe.

24. The method of claim 1, where in the tube is a glass pipe.

25. The method of claim 1, wherein the tube is a polymeric pipe.

26. The method of claim 1, wherein the tube is a composite pipe.

27. The method of claim 1, further comprising cleaning the inner surface of the tube by abrasive particle blasting before depositing the powder particles onto the inner surface of the tube.

* * * * *